US011993037B1

(12) United States Patent
Mahadevan et al.

(10) Patent No.: US 11,993,037 B1
(45) Date of Patent: *May 28, 2024

(54) CONTACT LENS DISPLAYING IMPROVED VISION ATTRIBUTES

(71) Applicant: Johnson & Johnson Vision Care, Inc., Jacksonville, FL (US)

(72) Inventors: Shivkumar Mahadevan, Jacksonville, FL (US); Dawn D. Wright, St. Augustine, FL (US); Patricia Martin, Jacksonville, FL (US); Jie Xu, St. Johns, FL (US); John R. Buch, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,536

(22) Filed: Dec. 16, 2021

Related U.S. Application Data

(63) Continuation-in-part of application No. 17/110,443, filed on Dec. 3, 2020, now Pat. No. 11,820,899.
(Continued)

(51) Int. Cl.
*B29D 11/00* (2006.01)
*G02B 1/04* (2006.01)
*G02C 7/04* (2006.01)

(52) U.S. Cl.
CPC ........ *B29D 11/00038* (2013.01); *G02B 1/043* (2013.01); *G02C 7/049* (2013.01)

(58) Field of Classification Search
CPC ... G02B 1/043; B29D 11/00038; G02C 7/049
See application file for complete search history.

(56) References Cited

U.S. PATENT DOCUMENTS 3,196,150 A 7/1965 Martin
3,376,303 A 4/1968 Fuchs et al.
(Continued)

FOREIGN PATENT DOCUMENTS

CN 1301352 A 6/2001
CN 102264709 A 11/2011
(Continued)

OTHER PUBLICATIONS

Active Methylene Compounds, The journal of organic chemistry, Jan. 1, 1992, pp. 3551-3557, vol. 57.
(Continued)

*Primary Examiner* — Mathieu D Vargot
(74) *Attorney, Agent, or Firm* — Troutman Pepper Hamilton Sanders LLP

(57) ABSTRACT

A method or use of a contact lens, includes applying to at least one eye of a contact lens wearer the contact lens that is a free radical reaction product of a reactive mixture that includes one or more polymerizable compounds suitable for making the contact lens; and a high energy visible (HEV) light absorbing compound; and improving, by the contact lens, at least one clinical attribute comprising overall preference of the contact lens while using computer screens and digital devices as observed by the contact lens wearer, comfort at the end of the day, CLUE Comfort score, CLUE Vision score.

33 Claims, 14 Drawing Sheets

Related U.S. Application Data which is a continuation of application No. 16/268,897, filed on Feb. 6, 2019, now Pat. No. 10,935,695, application No. 17/552,536 is a continuation-in-part of application No. 16/938,117, filed on Jul. 24, 2020, application No. 17/552,536 is a continuation-in-part of application No. 16/938,145, filed on Jul. 24, 2020, now Pat. No. 11,543,683.

(60) Provisional application No. 62/691,112, filed on Jun. 28, 2018, provisional application No. 62/637,505, filed on Mar. 2, 2018, provisional application No. 62/893,996, filed on Aug. 30, 2019, provisional application No. 62/894,015, filed on Aug. 30, 2019.

(56) References Cited

U.S. PATENT DOCUMENTS

| | | | |
|---|---|---|---|
| 3,408,429 | A | 10/1968 | Wichterle |
| 3,660,545 | A | 5/1972 | Wichterle |
| 3,769,294 | A | 10/1973 | Catino et al. |
| 3,808,178 | A | 4/1974 | Gaylord |
| 4,113,224 | A | 9/1978 | Clark et al. |
| 4,120,570 | A | 10/1978 | Gaylord |
| 4,136,250 | A | 1/1979 | Mueller et al. |
| 4,153,641 | A | 5/1979 | Deichert et al. |
| 4,197,266 | A | 4/1980 | Clark et al. |
| 4,436,887 | A | 3/1984 | Chromecek et al. |
| 4,495,313 | A | 1/1985 | Larsen |
| 4,659,763 | A | 4/1987 | Spinelli |
| 4,659,782 | A | 4/1987 | Spinelli |
| 4,659,783 | A | 4/1987 | Spinelli |
| 4,740,533 | A | 4/1988 | Su et al. |
| 4,889,664 | A | 12/1989 | Kindt-Larsen et al. |
| 4,910,277 | A | 3/1990 | Bambury et al. |
| 5,006,622 | A | 4/1991 | Kunzler et al. |
| 5,034,461 | A | 7/1991 | Lai et al. |
| 5,039,459 | A | 8/1991 | Kindt-Larsen et al. |
| 5,070,215 | A | 12/1991 | Bambury et al. |
| 5,236,969 | A | 8/1993 | Kunzler et al. |
| 5,244,981 | A | 9/1993 | Seidner et al. |
| 5,270,418 | A | 12/1993 | Kunzler et al. |
| 5,298,533 | A | 3/1994 | Nandu et al. |
| 5,314,960 | A | 5/1994 | Spinelli et al. |
| 5,331,067 | A | 7/1994 | Seidner et al. |
| 5,371,147 | A | 12/1994 | Spinelli et al. |
| 5,470,932 | A | 11/1995 | Jinkerson |
| 5,480,927 | A | 1/1996 | Janssen et al. |
| 5,729,322 | A | 3/1998 | Collins et al. |
| 5,760,100 | A | 6/1998 | Nicolson et al. |
| 5,776,999 | A | 7/1998 | Nicolson et al. |
| 5,824,719 | A | 10/1998 | Kunzler et al. |
| 5,872,118 | A | 2/1999 | Kelley et al. |
| 5,916,719 | A | 6/1999 | Kim et al. |
| 5,944,853 | A | 8/1999 | Molock et al. |
| 5,945,465 | A | 8/1999 | Ozark et al. |
| 5,962,548 | A | 10/1999 | Vanderlaan et al. |
| 5,965,631 | A | 10/1999 | Nicolson et al. |
| 5,977,219 | A | 11/1999 | Ravichandran et al. |
| 5,998,498 | A | 12/1999 | Vanderlaan et al. |
| 6,020,445 | A | 2/2000 | Vanderlaan et al. |
| 6,022,158 | A | 2/2000 | Nakayama et al. |
| 6,087,415 | A | 7/2000 | Vanderlaan et al. |
| 5,489,811 | B1 | 11/2000 | Nicolson et al. |
| 5,789,461 | B1 | 11/2000 | Nicolson et al. |
| 6,158,862 | A | 12/2000 | Patel et al. |
| 6,166,218 | A | 12/2000 | Ravichandran et al. |
| 6,207,244 | B1 | 3/2001 | Hesch |
| 6,244,707 | B1 | 6/2001 | Faubl |
| 6,367,929 | B1 | 4/2002 | Maiden et al. |
| 6,373,615 | B1 | 4/2002 | Mann et al. |
| 6,420,453 | B1 | 7/2002 | Bowers et al. |
| 6,423,761 | B1 | 7/2002 | Bowers et al. |
| 6,767,979 | B1 | 7/2004 | Muir et al. |
| 6,807,745 | B2 | 10/2004 | Orton |
| 6,822,016 | B2 | 11/2004 | McCabe et al. |
| 6,867,245 | B2 | 3/2005 | Wata et al. |
| 6,918,931 | B2 | 7/2005 | Lai et al. |
| 6,943,203 | B2 | 9/2005 | Vanderlaan et al. |
| 6,951,894 | B1 | 10/2005 | Nicolson et al. |
| 7,033,391 | B2 | 4/2006 | Lai et al. |
| 7,052,131 | B2 | 5/2006 | McCabe |
| 7,247,692 | B2 | 7/2007 | Laredo et al. |
| 7,249,848 | B2 | 7/2007 | Laredo et al. |
| 7,276,544 | B2 | 10/2007 | Lai et al. |
| 7,396,890 | B2 | 7/2008 | Zanini et al. |
| 7,461,937 | B2 | 12/2008 | Steffen et al. |
| 7,468,398 | B2 | 12/2008 | Nicolson et al. |
| 7,538,146 | B2 | 5/2009 | Nicolson et al. |
| 7,553,860 | B2 | 6/2009 | Nicolson et al. |
| 7,553,880 | B2 | 6/2009 | Nicolson et al. |
| 7,572,841 | B2 | 8/2009 | Chen et al. |
| 7,666,921 | B2 | 2/2010 | McCabe et al. |
| 7,691,916 | B2 | 4/2010 | McCabe et al. |
| 7,691,918 | B2 | 4/2010 | Jinkerson et al. |
| 7,728,051 | B2 | 6/2010 | Weinschenk, III et al. |
| 7,781,571 | B2 | 8/2010 | Weinschenk, III et al. |
| 7,786,185 | B2 | 8/2010 | Rathore et al. |
| 7,803,359 | B1 | 9/2010 | Jinkerson et al. |
| 7,825,170 | B2 | 11/2010 | Steffen et al. |
| 7,915,323 | B2 | 3/2011 | Awasthi et al. |
| 7,934,830 | B2 | 5/2011 | Blackwell et al. |
| 7,956,131 | B2 | 6/2011 | Arnold et al. |
| 7,994,356 | B2 | 8/2011 | Awasthi et al. |
| 8,022,158 | B2 | 9/2011 | Rathore et al. |
| 8,026,326 | B2 | 9/2011 | Benz et al. |
| 8,043,607 | B2 | 10/2011 | Jinkerson |
| 8,138,290 | B2 | 3/2012 | Blackwell et al. |
| 8,153,703 | B2 | 4/2012 | Laredo |
| 8,163,206 | B2 | 4/2012 | Chang |
| 8,207,244 | B2 | 6/2012 | Laredo |
| 8,236,053 | B1 | 8/2012 | Freeman |
| 8,262,947 | B2 | 9/2012 | Laredo |
| 8,262,948 | B2 | 9/2012 | Laredo et al. |
| 8,273,802 | B2 | 9/2012 | Laredo et al. |
| 8,323,631 | B2 | 12/2012 | Jinkerson |
| 8,329,775 | B2 | 12/2012 | Laredo |
| 8,360,574 | B2 | 1/2013 | Ishak et al. |
| 8,389,597 | B2 | 3/2013 | Blackwell et al. |
| 8,399,538 | B2 | 3/2013 | Steffen et al. |
| 8,415,404 | B2 | 4/2013 | Nicolson et al. |
| 8,420,711 | B2 | 4/2013 | Awasthi et al. |
| 8,450,387 | B2 | 5/2013 | McCabe et al. |
| 8,470,906 | B2 | 6/2013 | Rathore et al. |
| 8,476,390 | B2 | 7/2013 | Benz et al. |
| 8,487,058 | B2 | 7/2013 | Liu et al. |
| 8,507,577 | B2 | 8/2013 | Zanini et al. |
| 8,568,626 | B2 | 10/2013 | Nicolson et al. |
| 8,585,938 | B1 | 11/2013 | Jinkerson et al. |
| 8,618,323 | B2 | 12/2013 | Benz et al. |
| 8,637,621 | B2 | 1/2014 | Iwata et al. |
| 8,703,891 | B2 | 4/2014 | Broad |
| 8,784,867 | B2 | 7/2014 | Samuel et al. |
| 8,807,745 | B2 | 8/2014 | Nunez et al. |
| 8,937,110 | B2 | 1/2015 | Alli et al. |
| 8,937,111 | B2 | 1/2015 | Alli et al. |
| 8,940,812 | B2 | 1/2015 | Reboul et al. |
| 8,980,972 | B2 | 3/2015 | Driver |
| 9,005,700 | B2 | 4/2015 | Bothe et al. |
| 9,056,878 | B2 | 6/2015 | Fujisawa et al. |
| 9,057,821 | B2 | 6/2015 | Broad et al. |
| 9,125,808 | B2 | 9/2015 | Alli et al. |
| 9,125,829 | B2 | 9/2015 | Bonda et al. |
| 9,140,825 | B2 | 9/2015 | Alli et al. |
| 9,145,383 | B2 | 9/2015 | Bonda et al. |
| 9,156,934 | B2 | 10/2015 | Alli et al. |
| 9,170,349 | B2 | 10/2015 | Mahadevan et al. |
| 9,217,813 | B2 | 12/2015 | Liu et al. |
| 9,244,196 | B2 | 1/2016 | Scales et al. |
| 9,244,197 | B2 | 1/2016 | Alli et al. |
| 9,249,249 | B2 | 2/2016 | Awasthi et al. |
| 9,260,544 | B2 | 2/2016 | Rathore et al. |
| 9,278,949 | B2 | 3/2016 | Loccufier |
| 9,297,928 | B2 | 3/2016 | Molock et al. |

(56) References Cited

U.S. PATENT DOCUMENTS

| | | |
|---|---|---|
| 9,297,929 B2 | 3/2016 | Scales et al. |
| 9,315,669 B2 | 4/2016 | Holland et al. |
| 9,439,487 B2 | 9/2016 | Barre et al. |
| 9,611,246 B2 | 4/2017 | Bonda et al. |
| 9,637,444 B2 | 5/2017 | Qian |
| 9,667,800 B2 | 5/2017 | Rodriguez et al. |
| 9,765,051 B2 | 9/2017 | Bonda et al. |
| 9,867,800 B2 | 1/2018 | Bonda et al. |
| 9,926,289 B2 | 3/2018 | Bonda et al. |
| 9,927,635 B2 | 3/2018 | Ishak et al. |
| 9,957,258 B2 | 5/2018 | Kunimoto et al. |
| 10,113,075 B2 | 10/2018 | Nesvadba et al. |
| 10,254,443 B2 | 4/2019 | McCabe et al. |
| 10,268,053 B2 | 4/2019 | Holland et al. |
| 10,338,408 B2 | 7/2019 | Bothe et al. |
| 10,597,515 B2 | 3/2020 | Nesvadba et al. |
| 10,935,695 B2 | 3/2021 | Mahadevan et al. |
| 11,401,400 B2 | 8/2022 | Shishino et al. |
| 11,543,683 B2 | 1/2023 | Mahadevan et al. |
| 2002/0042653 A1 | 4/2002 | Copeland et al. |
| 2004/0070726 A1 | 4/2004 | Ishak |
| 2005/0018131 A1 | 1/2005 | Ishak |
| 2005/0055090 A1 | 3/2005 | Lai et al. |
| 2005/0055091 A1 | 3/2005 | Lai et al. |
| 2005/0243272 A1* | 11/2005 | Mainster ............... A61F 2/1659 351/159.24 |
| 2005/0254003 A1 | 11/2005 | Jani et al. |
| 2006/0092374 A1 | 5/2006 | Ishak |
| 2006/0252850 A1 | 11/2006 | Jani et al. |
| 2007/0092830 A1 | 4/2007 | Lai et al. |
| 2007/0092831 A1 | 4/2007 | Lai et al. |
| 2007/0100018 A1 | 5/2007 | Hagting et al. |
| 2007/0216861 A1 | 9/2007 | Ishak et al. |
| 2008/0002147 A1 | 1/2008 | Haywood et al. |
| 2010/0048847 A1 | 2/2010 | Broad |
| 2010/0113641 A1 | 5/2010 | Laredo |
| 2010/0168359 A1 | 7/2010 | Domschke et al. |
| 2010/0321632 A1 | 12/2010 | Sanger |
| 2011/0245818 A1 | 10/2011 | Weinschenk, III |
| 2011/0249234 A1 | 10/2011 | Duis et al. |
| 2012/0196951 A1 | 6/2012 | Mentak |
| 2012/0262792 A1 | 10/2012 | Goldberg et al. |
| 2013/0009059 A1 | 1/2013 | Caruso |
| 2013/0095235 A1 | 4/2013 | Bothe et al. |
| 2013/0168617 A1 | 7/2013 | Alli et al. |
| 2013/0172440 A1 | 7/2013 | Alli et al. |
| 2013/0217620 A1 | 8/2013 | Alli et al. |
| 2014/0024791 A1 | 1/2014 | Alli et al. |
| 2014/0031447 A1 | 1/2014 | Alli et al. |
| 2014/0044654 A1 | 2/2014 | Bonda et al. |
| 2014/0050681 A1 | 2/2014 | Bonda et al. |
| 2014/0093661 A1 | 4/2014 | Trajkovska et al. |
| 2014/0178595 A1 | 6/2014 | Bothe et al. |
| 2015/0092155 A1 | 4/2015 | Chang et al. |
| 2015/0094395 A1 | 4/2015 | Alli et al. |
| 2015/0164852 A1 | 6/2015 | Bonda et al. |
| 2015/0175732 A1 | 6/2015 | Awasthi et al. |
| 2015/0316688 A1 | 11/2015 | Cefalo et al. |
| 2016/0002200 A1 | 1/2016 | Bonda et al. |
| 2016/0022555 A1 | 1/2016 | Bonda et al. |
| 2017/0038605 A1 | 2/2017 | Legerton |
| 2017/0075137 A1 | 3/2017 | Lin et al. |
| 2017/0131574 A1 | 5/2017 | Lee |
| 2017/0261768 A1 | 9/2017 | Ambler et al. |
| 2018/0037690 A1 | 2/2018 | Aitken et al. |
| 2018/0164608 A1 | 6/2018 | Schmeder et al. |
| 2018/0208583 A1 | 7/2018 | Kunimoto et al. |
| 2018/0263951 A1 | 9/2018 | Bonda et al. |
| 2019/0002459 A1 | 1/2019 | Mahadevan et al. |
| 2019/0121162 A1 | 4/2019 | Alli et al. |
| 2019/0169438 A1 | 6/2019 | Frornentin et al. |
| 2019/0179170 A1 | 6/2019 | Chang et al. |
| 2019/0271798 A1* | 9/2019 | Mahadevan .......... C08F 271/02 |
| 2020/0347166 A1 | 11/2020 | Alli et al. |
| 2020/0347167 A1 | 11/2020 | Alli et al. |
| 2020/0407324 A1 | 12/2020 | Mahadevan et al. |
| 2020/0407337 A1 | 12/2020 | Mahadevan |
| 2021/0061934 A1* | 3/2021 | Martin .................... G02C 7/10 |
| 2021/0063770 A1* | 3/2021 | Mahadevan .......... G02C 7/104 |
| 2022/0194944 A1 | 6/2022 | Mahadevan |

FOREIGN PATENT DOCUMENTS

| | | |
|---|---|---|
| CN | 103917899 A | 7/2014 |
| CN | 203965745 * | 11/2014 |
| CN | 104508080 A | 4/2015 |
| CN | 106349212 A | 1/2017 |
| CN | 108586289 A | 9/2018 |
| EP | 0080539 A1 | 6/1983 |
| EP | 80539 B1 | 6/1983 |
| EP | 0131468 A2 | 1/1985 |
| EP | 131468 B1 | 1/1985 |
| EP | 924203 A1 | 6/1999 |
| EP | 1870735 A1 | 12/2007 |
| EP | 2123638 A1 | 11/2009 |
| EP | 3052534 A1 | 8/2016 |
| EP | 3419961 A1 | 1/2019 |
| EP | 3052534 B1 | 9/2020 |
| EP | 3419961 B1 | 9/2020 |
| FR | 1469893 A | 2/1967 |
| GB | 217810 | 6/1924 |
| GB | 2319035 A | 5/1998 |
| JP | H0743918 A | 2/1995 |
| JP | 2004243596 A | 9/2004 |
| JP | 2004277581 | 10/2004 |
| JP | 200850463 A | 3/2008 |
| JP | 4627009 B2 | 2/2011 |
| JP | 5544017 B2 | 7/2014 |
| RU | 2175321 C2 | 10/2001 |
| RU | 2196557 C2 | 1/2003 |
| RU | 2197907 C2 | 2/2003 |
| RU | 2294132 C2 | 2/2007 |
| RU | 2466173 C1 | 11/2012 |
| RU | 2540655 C2 | 2/2015 |
| RU | 2557993 C1 | 7/2015 |
| RU | 2577800 C2 | 3/2016 |
| WO | 1999063366 A1 | 12/1999 |
| WO | 2001030866 A1 | 5/2001 |
| WO | 200212205 A1 | 2/2002 |
| WO | 200242281 A1 | 5/2002 |
| WO | 2003022321 A2 | 3/2003 |
| WO | 2003089519 A1 | 10/2003 |
| WO | 2007050395 A2 | 5/2007 |
| WO | 2008061992 A2 | 5/2008 |
| WO | 2011130139 A1 | 10/2011 |
| WO | 2013055746 A1 | 4/2013 |
| WO | 2014018208 A1 | 1/2014 |
| WO | 2014025370 A1 | 2/2014 |
| WO | 2015048035 A1 | 4/2015 |
| WO | 2016100457 A1 | 6/2016 |
| WO | 2016175619 A1 | 11/2016 |
| WO | 2017073467 A1 | 5/2017 |
| WO | 2019166971 A1 | 9/2019 |
| WO | 2020261021 A1 | 12/2020 |
| WO | 2020261091 A1 | 12/2020 |

OTHER PUBLICATIONS

Beatty et al., Macular pigment and age related macular degeneration, Br. J. Ophthalmol. 1999, vol. 83, pp. 867-877.

Belusa et al., 2-(2-Hydroxyphenyl)benzotriazoles. I. Synthesis and their ultraviolet and infrared spectra, Chem.zvesti 1974, vol. 28, No. 5, pp. 673-679.

Bernstein et al., Lutein, zeaxanthin, and meso-zeaxanthin: The basic and clinical science underlying carotenoidbased nutritional interventions against ocular disease, Progress in Retinal and Eye Research, vol. 50, pp. 34-66, (2016).

Berthon et al.; Synthesis, Electrochemical and Spectroscopic Properties of Pendant Hydroquinone-and Quinone-Substitued Polypyridyl Ruthenium (11) Complex, Inorganica Chimica Acta, 1993, pp. 3-7, vol. 204.

(56) References Cited

OTHER PUBLICATIONS

Boon et al., Factors Influencing the Chemical Stability of Carotenoids in Foods, Critical Reviews in Food Science and Nutrition, vol. 50, pp. 515-532 (2010).

Burton et al., B-Carotene autoxidation: oxygen copolymerization, non-vitamin A products, and immunological activity, Can. J. Chem., vol. 92, pp. 305-316 (2014).

Chen et al., Dicyanomethylenated Acridone Based Crystals: Torsional Vibration Confinement Induced Emission with Supramolecular Structure Dependent and Stimuli Responsive Characteristics, The Journal of Physical Chemistry, 2016, 587-97, 120.

Compendium of Polymer Terminology and Nomenclature: IUPAC Recommendations 2008, edited by: Richard G. Jones, Jaroslav Kahovec, Robert Stepto, Edward S. Walks, Michael Hess, Tatsuki Kitayama, and W. Val Metanomski.

Crivello et al., Photoinitiators for Free Radical Cationic & Anionic Photopolymerisation, 2nd Edition, vol. III, pp. 275-298, John Wiley and Sons, New York, 1998.

Doutch et al., Ultraviolet Light Transmission through the Human Corneal Stroma Is Reduced in the Periphery, Biophysical Journal, vol. 102. Mar. 2012, pp. 1258-1264.

Hafez et al, Carbonyl and Thiocarbonyl Compounds. V. Synthesis of Newer Unsaturated Nitriles, Carboxylic Acids, and Esters Derived from Xanthene and Thiaxanthene, Journal of Organic Chemistry, vol. 26, pp. 3988-3991, Oct. 1961.

Ham et al., Retinal sensitivity to damage from short wavelength light. Nature 260 (1976), pp. 153-155.

Hammond et al, Contralateral comparison of blue-filtering and non-blue-filtering intraocular lenses: glare disability, heterochromatic contrast, and photostress recovery, Clinical Ophthalmology, 2010, pp. 1465-1473, vol. 4, Dovepress, US.

International Conference on Harmonisation (ICH) of Technical Requirements for Registration of Pharmaceuticals for Human Use guideline, Q1B Photostability Testing of New Drug Substances and Products, published on Nov. 1996.

Jockusch et al., Photostabilization of Endogenous Porphyrins: Excited State Quenching by Fused Ring Cyanoacrylates, Photchemical & Photobiological Sciences, 2014, vol. 13, No. 8, pp. 1180-1184.

Johnston et al., Biologically Active Polymers from Spontaneous Carotenoid Oxidation: A New Frontier in Carotenoid Activity, Pios One, vol. 9, Issue 10, pp. 1-10 (Oct. 2014).

Lam et al., Synthesis of Dinucleating Phenanthroline -Based Ligands, Tetrahedron, Jul. 9, 1999, pp. 8377-8384, vol. 55 Issue 28.

Latif et al. Cleavage of Xanthene Ethers A New Route to 9-Substituted Xanthenes, Canadian Journal of Chemistry, vol. 42 (1964), pp. 1736-1740.

Luning, et al., Bimacrocylic 1,10-Phenanthroline Cyclophanes, Chemische Seri, 1990, pp. 643-645, vol. 123; Issue 3.

Nishino et al., Manganese (III)-Mediated Carbon-Carbon Bond Formation In The Reaction Of Xanthenes With Active Methylene Compounds, J. Org. Chem., Jan. 1, 1992, pp. 3551-3557, vol. 57.

Reck et al., Enantiopure Chiral Chiral Concave 1,10-Phenanthrolines, European Journal of Organic Chemistry, 2016, pp. 1119-1131, vol. 2016; Issue 6.

Ribeiro et al., Antioxidant and pro-oxidant activities of carotenoids and their oxidation products, Food and Chemical Toxicology, vol. 120, pp. 681-699 (2018).

Sato et al., Synthesis and characterization of electron transporting polymers having thioxanthene derivatives, Synthetic Metals, Jan. 1, 1999, pp. 55-60, vol. 105.

Selvam et al., Tunable anchoring groups@acridone-linked triphenylamine based pendant chromophores and their effects on the photovoltaic performance as sensitizers for dye-sensitized solar cellst, RSC Advances, Jan. 1, 2016, pp. 109054-60, vol. 6 Issue 110.

Statement on Ocular Ultraviolet Radiation Hazards in Sunlight, American Optometric Association, Nov. 10, 1993.

Stringham et al., Macular Pigment and Visual Performance in Glare: Benefits for Photostress Recovery, Disability Glare, and Visual Discomfort, IOVS, Sep. 2011, vol. 52, No. 10, pp. 7406-7415.

Takeda et al, Anisotropic Dissociation of rr-n- Stacking and Flipping-Motion- Induced Crystal Jumping in Alkylacridones and Their Dicyanomethylene Derivatives, Chem. Eur. J., 2016, 7763-70, 22.

Ty et al., Oxidation and Thermal Degradation of Carotenoids, Journal of Oil Palm Research, vol. II, No. 1, pp. 62-78 (Jun. 1999).

PCT International Preliminary Report on Patentability, dated Sep. 8, 2020, for PCT Intl Appln. No. PCT/ B2019/051582 (VIN5701WOPCT1).

PCT International Search Report, dated Oct. 4, 2018, for PCT Intl Appln. No. PCT/IB2018/054588 (VIN5690WOPCT).

PCT International Preliminary Report on Patentability, dated Dec. 28, 2021, for PCT Intl Appln. No. PCT/IB2020/055868.

PCT International Search Report, dated Oct. 9, 2020, for PCT Intl Appln. No. PCT/IB2020/057732.

PCT International Search Report, dated Oct. 9, 2020, for PCT Intl Appln. No. PCT/IB2020/057733.

PCT International Search Report, dated Jul. 17, 2018, for PCT Int'l Appln. No. PCT/IB2018/053669 (VTN5601WOPCT).

PCT International Search Report, dated Jul. 23, 2020, for PCT Intl Appln. No. PCT/IB2020/055485 (VIN6032WOPCT1).

PCT International Search Report, dated Sep. 23, 2020, for PCT Intl Appln. No. PCT/IB2020/055868.

PCT International Search Report, dated May 24, 2019, for PCT Int'l Appln. No. PCT/IB2019/051582.

PCT International Preliminary Report on Patentability, dated Dec. 28, 2021, for PCT Intl Appln. No. PCT/IB2020/055485 (VTN6032WOPCT1).

Bondyreva; "Polimerization", Methodological Guidelines for Independent Work. Nizhnekamsk Chemical and Technological Institute of the Federal State Budget Educational Institution of Higher Professional Education "Kazan National Research Technological University", Nizhnekamsk, 2014, pp. 4-13.

Kolpashchikova et al.; "Organic Chemistry" Part II. Arenes. Halogened Hydrocarbons. Ministry of Education of the Russian Federation. Yaroslavl State Technical University, 1999, p. 14.

Sutjagin et al.; "Chemistry and Physics of Polymers," Training Manual. TPU Publishing House, Tomsk, 2003, Chapter 1, p. 9, Chapter 2, pp. 19-56.

PCT International Preliminary Report on Patentability, dated Mar. 1, 2022, for PCT Int'l Appln. No. PCT/IB2020/057732 (VTN6050WOPCT1).

PCT International Preliminary Report on Patentability, dated Mar. 1, 2022, for PCT Int'l Appln. No. PCT/IB2020/057733 (VTN6051WOPCT1).

PCT International Search Report, dated Mar. 1, 2022, for PCT Int'l Appln. No. PCT/IB2021/061175 (VTN6076WOPCT1).

Chakrabarti et al., "Statistics of Real-World Hyperspectral Images", CVPR 2011, pp. 193-200, Jun. 20-25, 2011.

Das, et al., "In vitro and schematic model eye assessment of glare or positive dysphotopsia-type photic phenomena: comparison of a new material IOL to other monofocal IOLs", Journal of Cataract and Refractive Surgery, vol. 45, Issue 2, pp. 219-227, Feb. 2019.

Elsherif et al., "Contact Lenses for Color Vision Deficiency", Advanced Materials Technologies, vol. 6, Issue 1, pp. 1-9, Jan. 2021.

Fadli et al., "Permeation and Pervaporation of Water through Contact Lens Materials," Johnson Johnson Vision Care, Inc., Jacksonville, FL, USA, 8th International Conference on the Tear Film & Ocular Surface: Basic Science and Clinical Relevance, Montpellier, France, Sep. 7-10, 2016.

Foster et al., "Frequency of Metamerism in Natural Scenes", Journal of the Optical Society of America A, vol. 23, No. 10, pp. 2359-2372, Oct. 2006.

Harris et al., "Effect of Tinted Contact Lenses on Color Vision", Am J Optom Physiol Opt., vol. 53, No. 3, pp. 145-148, Mar. 1976.

International Search Report for International Application No. PCT/IB2018/054585, dated Nov. 9, 2018, 5 Pages.

Laxer, "Soft Tinted Contact Lenses and Color Discrimination", International Contact Lens Clinic, vol. 17, pp. 88-91, Mar.-Apr. 1990.

Machine English translation of JPH0743918A, Fujimoto et al. (Year: 1995).

(56) References Cited

OTHER PUBLICATIONS

Macleod etaL, "Chromaticity Diagram Showing Cone Excitation by Stimuli of Equal Luminance", Journal of the Optical Society of America, vol. 69, Issue 8, pp. 1183-1186, Aug. 1979.

Mencucci et al., "Visual Outcome, Optical Quality and Patients Satisfaction with a New Monofocal Intraocular Lens, Enhanced for Intermediate Vision: Preliminary Results", Journal of Cataract Refractive Surgery, vol. 46, Issue 3, pp. 378-387, Mar. 2020.

Miao et aL, "Objective Optical Quality and Intraocular Scattering in Myopic Adults", Investigative Ophthalmology Visual Science, vol. 55, No. 9, pp. 5582-5587, Sep. 2014.

Mostafa et aL, "The Effect of Age and Gender on Tear Film Breakup Time", In Egyptian Journal of Medical Research, vol. 2, Issue 2, 11 pages, 2021.

Nascimento et aL, "Statistics of Spatial Cone-excitation Ratios in Natural Scenes", Journal of the Optical Society of America A, vol. 19, Issue 8, pp. 1484-1490, Aug. 2002.

Parraga et al, "Color and Luminance Information in Natural Scenes", Journal of the Optical Society of America A, vol. 15, No. 3, pp. 563-569, Mar. 1998.

Patel et aL, "Effect of Visual Display Unit Use on Blink Rate and Tear Stability", In Optom Visual Sci, vol. 68, Issue 11, pp. 888-892, Nov. 1991.

Pokorny etaL, "Aging of the Human Lens", Applied Optics, vol. 26, No. 8, pp. 1437-1440, Apr. 1987.

Riederer D., et al., "Evaporation Rates from Hydrogel Contact Lenses Using Dynamic Vapor Sorption", 1st North American Symposium on Dynamic Vapor Sorption, Philadelphia, PA (Invited talk), Sep. 17-18, 2018.

Riederer D., et al., "New Methods for Measuring Water Transport through Hydrogel Contact Lenses," (Poster), The Association for Research in Vision and Ophthalmology, Baltimore, MD, May 7-11, 2017, JJVCI Pubstrat # 45222.

Riederer D., et al., "Permeation and Pervaporation of Water through Contact Lens Materials," (Oral Presentation), American Academy of Optometry, Anaheim, CA, Nov. 9-12, 2016, JJVCI Pubstrat # 44835.

Riederer D., et al., "Pervaporation as a Metric for Evaporative Water Loss from Contact Lenses," The Association for Research in Vision and Ophthalmology annual meeting (ARVO), Jun. 2020. (Virtual Presentation).

Riederer D., et al., "Water Loss from Contact Lenses: Material Dependent Rates of Evaporation and Permeation," European Contact Lens Society of Ophthalmologists (ECLSO), London, UK, Dec. 1-2, 2017, Presented by Rachel Hiscox**, *Johnson & Johnson Vision Care Inc., Florida USA, ** Johnson & Johnson Vision, UK.

Riederer D., et al., "Water Loss from Contact Lenses: Material Dependent Rates of Evaporation and Permeation" (Poster), British Contact Lens Association, Liverpool, UK, Jun. 9-11, 2017, JJVCI Pubstrat # 45327.

Stockman et al., "The Spectral Sensitivities of the Middle- and Long-wavelength-sensitive Cones Derived from Measurements in Observers of Known Genotype", Vision Research, vol. 40, pp. 1711-1737, 2000.

Tan et al., "Dynamic Change of Optical Quality in Patients with Dry Eye Disease", In Invest Ophthalmol Vis Sci. Volume 56, Issue 5, pp. 2848-2854, May 2015.

Tester et al., "Dysphotopsia in phakic and pseudophakic patients: incidence and relation to intraocular lens type", In Journal of Cataract Refractive Surgery vol. 26, Issue 6, pp. 810-816, Jun. 2000.

Tsubota et al., "Dry Eyes and Video Display Terminals", In New England Journal of Medicine, vol. 328, Issue 8, p. 584, Feb. 25, 1993.

Van den Berg, T. J. T. P, "Importance of Pathological Intraocular Light Scatter for Visual Disability." In Documenta Ophthalmologica, vol. 61, pp. 327-333, 1986.

Xi et aL, "Assessment of Tear Film Optical Quality in a Young Short Tear Break-up Time Dry Eye: Case-control study", Medicine, vol. 98, Issue 40, pp. 1-6, 2019.

\* cited by examiner

| Overall Enrollment | Strata | Test/Control | Control/Test | Total |
|---|---|---|---|---|
| Randomized | Overall | 100 | 100 | 200 |
| | Habitual Daily Disposable | 70 | 70 | 140 |
| | Habitual Daily Wear Reusable | 30 | 30 | 60 |
| Completed | Overall | 85 | 85 | 170 |
| | Habitual Daily Disposable | 59~60 | 59~60 | 118-120 |
| | Habitual Daily Wear Reusable | 25~26 | 25~26 | 50-52 |

Fig. 1

| Visit Information | Visit 1 Screening, Baseline, Treatment 1 | Visit 2 1-week FU Treatment 1 | Visit 3 2-week FU Treatment 1, Treatment 2 Fitting | Visit 4 1-week FU Treatment 2 | Visit 5 2-week FU Treatment 2 Final Evaluation |
|---|---|---|---|---|---|
| Time Point | | 7 days after Visit 1 (+/- 1 day) | 7 days after Visit 2 (+/- 1 day) | 7 days after Visit 3 (+/- 1 day) | 7 days after Visit 4 (+/- 1 day) |
| Estimated Visit Duration | 2.0 hours | 1.5 hours | 2.0 hours | 1.5 hours | 1.0 hours |
| Statement of Informed Consent | x | | | | |
| Demographics | x | | | | |
| Medical History/Concomitant Medications | x | x | x | x | x |
| Habitual Contact Lens Information | x | | | | |
| Inclusion/Exclusion Criteria | x | | | | |
| Study Questionnaires Baseline | x | | | | |
| Entrance Visual Acuity | x | x | x | x | x |
| Slit Lamp Biomicroscopy | x | x | x | x | x |
| Expanded Conjunctival Redness | x | x | x | x | x |
| Expanded Corneal Staining | x | x | x | x | x |
| Iris Color | x | | | | |
| Subjective Spherocylindrical Refraction | x | | | | x |
| Lens Selection | x | | x | | |
| Lens Insertion & Settling | x | | x | | |
| Visual Acuity and Over Refraction | x | | x | | |
| Lens Power Modification (if applicable) | x | | x | | |

Fig. 2

| Visit Information | Visit 1 Screening, Baseline, Treatment 1 | Visit 2 1-week FU Treatment 1 | Visit 3 2-week FU Treatment 1, Treatment 2 Fitting | Visit 4 1-week FU Treatment 2 | Visit 5 2-week FU Treatment 2 Final Evaluation |
|---|---|---|---|---|---|
| Time Point | | 7 days after Visit 1 (+/- 1 day) | 7 days after Visit 2 (+/- 1 day) | 7 days after Visit 3 (+/- 1 day) | 7 days after Visit 4 (+/- 1 day) |
| Estimated Visit Duration | 2.0 hours | 1.5 hours | 2.0 hours | 1.5 hours | 1.0 hours |
| Subject Reported Ocular Symptoms | x | x | x | x | x |
| Study Questionnaires Fitting | x | | x | | |
| Lens Fit Assessment | x | x | x | x | x |
| Lens Wettability | x | x | x | x | x |
| Surface characteristics | x | x | x | x | x |
| Lens dispensing information and criteria | x | | x | | |
| Patient instructions | x | | | | |
| Study Questionnaires FU | | x | x | x | x |
| Exit Acuity | x | x | x | x | x |

Fig. 3

1100 applying to at least one eye of a subject a contact lens that is a free radical reaction product of a reactive mixture including one or more polymerizable compounds suitable for making the contact lens and a high energy visible (HEV) light absorbing compound
1110

improving, by the contact lens, at least one clinical attribute comprising overall preference of the contact lens while using computer screens and digital devices as observed by the subject, comfort at the end of the day, CLUE Comfort score, CLUE Vision score
1120

Fig. 11

1200 applying to at least one eye of a subject a contact lens that is a free radical reaction product of a reactive mixture including one or more polymerizable compounds suitable for making the contact lens and a high energy visible (HEV) light absorbing compound
1210

improving, by the contact lens, comfort at the end of the day when compared to a second contact lens that transmits at least 90 percent of light across the wavelength range of 400 to 409 nm
1220

Fig. 12

1300 applying to at least one eye of a subject a contact lens that is a free radical reaction product of a reactive mixture including one or more polymerizable compounds suitable for making the contact lens and a high energy visible (HEV) light absorbing compound
1310 improving, by the contact lens, clarity of vision while driving at night when compared to a second contact lens that transmits at least 90 percent of light across the wavelength range of 400 to 409 nm
1320

Fig. 13

1400 applying to at least one eye of a subject a contact lens that is a free radical reaction product of a reactive mixture including one or more polymerizable compounds suitable for making the contact lens and a high energy visible (HEV) light absorbing compound
1410

improving, by the contact lens, overall preference of the contact lens while using computer screens and digital devices as observed by the subject when compared to a second contact lens that transmits at least 90 percent of light across the wavelength range of 400 to 409 nm
1420

Fig. 14

CONTACT LENS DISPLAYING IMPROVED VISION ATTRIBUTES

CROSS-REFERENCE TO RELATED APPLICATIONS

The present application is a continuation-in-part of U.S. application Ser. No. 17/110,443, filed Dec. 3, 2020, now U.S. Pat. No. 11,820,899, which is a continuation of U.S. application Ser. No. 16/268,897, filed Feb. 6, 2019, now U.S. Pat. No. 10,935,695, which claims priority to U.S. Provisional Application Nos. 62/691,112, filed Jun. 28, 2018, and 62/637,505, filed Mar. 2, 2018. The present application is also a continuation-in-part of U.S. application Ser. No. 16/938,117 filed Jul. 24, 2020, which claims the benefit of priority of U.S. Provisional Application No. 62/893,996, filed Aug. 30, 2019. This application is also a continuation-in-part of U.S. application Ser. No. 16/938,145, filed Jul. 24, 2020, now U.S. Pat. No. 11,543,683, which claims the benefit of priority of U.S. Provisional Application No. 62/894,015, filed Aug. 30, 2019. The contents of these applications are incorporated herein by reference in their entirety as if set forth verbatim.

FIELD

This disclosure relates to contact lenses that contain high energy visible (HEV) light absorbing compounds and their use for improving one or more vision attributes.

BACKGROUND

High energy light from the sun, such as UV light and high-energy visible light, is known to be responsible for cellular damage. While most of the radiation below 280 nm in wavelength is absorbed by the earth's atmosphere, photons possessing wavelengths ranging between 280 and 400 nm have been associated with several ocular disorders including corneal degenerative changes, and age-related cataract and macular degeneration. (See Statement on Ocular Ultraviolet Radiation Hazards in Sunlight, American Optometric Association, Nov. 10, 1993). The human cornea absorbs some radiation up to 320 nm in wavelength (30% transmission) (Doutch, J. J., Quantock, A. J., Joyce, N. C., Meek, K. M, Biophys. J, 2012, 102, 1258-1264), but is inefficient in protecting the back of the eye from radiation ranging from 320 to 400 nm in wavelength.

Contact lenses have been used commercially to improve vision since the 1950s. Contact lenses are currently available in a range of materials and millions of people wear contact lenses as their primary mode of optical correction. Spectacle and contact lenses which block substantial amounts (greater than 80%, and often greater than 90%) of UV light have been disclosed. Sunglasses, for example, block substantial quantities of UV and visible light. UV absorbing contact lenses also substantially block UV light, but provide nearly 100% transmission in the visible light range so the contact lenses can be worn in all lighting conditions.

Contact lens standards define the upper UV radiation wavelength at 380 nm. The current Class I UV absorbing criteria defined by the American Optometric Association require >99% of the radiation between 280 and 315 nm (UV B) and >90% of the 316 to 380 nm (UV A) radiation to be absorbed by the contact lens. While the criteria effectively address protection of the cornea (<1% UV B transmittance), there is little attention paid to the lower energy UV radiation (>380<400 nm) associated with retinal damage (Ham, W. T, Mueller, H. A., Sliney, D. H. *Nature* 1976; 260(5547):153-5) or to high energy visible radiation.

High energy visible (HEV) radiation may cause visual discomfort or circadian rhythm disruption. For example, computer and electronic device screens, flat screen televisions, energy efficient lights, and LED lights are known to generate HEV light. Prolonged exposure to such sources of HEV light may cause eye strain. Viewing HEV light emitting devices at night is also postulated to disrupt the natural circadian rhythm leading, for example, to inadequate sleep.

Absorption of high energy light radiation before it reaches the eye continues to be a desirable goal in the ophthalmic field. However, the extent to which a particular wavelength range is absorbed is also important. For instance, in the UV A and UV B ranges, it may be desirable to absorb as much radiation as possible. On the other hand, since HEV light forms a part of the visible spectrum, complete absorption of HEV light may negatively affect vision. With HEV light, therefore, partial absorption may be more desirable.

There is a need for materials that provide targeted absorption of undesirable wavelengths of high energy radiation, and that are processable into functional products. Compounds that absorb or attenuate high energy radiation, when used in ophthalmic devices, can help protect the cornea, as well as the interior cells in the ocular environment, from degradation, strain, and/or circadian rhythm disruption.

SUMMARY

The subject of this disclosure is the devices, systems and methods that use a contact lens for improving at least one clinical attribute in a contact lens wearer.

The invention relates to contact lenses that filter high energy visible (HEV) light, and optionally UV light, while substantially transmitting (e.g., greater than 80% transmission) at wavelengths longer than about 450 nm. The contact lenses provide significant improvement in a number of vision attributes, including comfort at the end of the day, clarity of vision or confidence while driving at night, viewing computer screens and digital devices, CLUE Comfort score, and CLUE Vision score.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

The above and further aspects of this disclosure are further discussed with reference to the following description in conjunction with the accompanying drawings, in which like numerals indicate like structural elements and features in various figures. The drawings are not necessarily to scale, emphasis instead being placed upon illustrating principles of the disclosure. The figures depict one or more implementations of the inventive devices, by way of example only, not by way of limitation.

FIG. 1 shows a table summarizing the enrollment strategy of the study of this disclosure.

FIG. 2 shows a table summarizing timing and events schedule in the study of this disclosure.

FIG. 3 shows a table continuing from FIG. 2 summarizing timing and events schedule in the study of this disclosure.

FIG. 11 depicts a method.

FIG. 12 depicts a method.

FIG. 13 depicts a method.

FIG. 14 depicts a method.

DETAILED DESCRIPTION

Figure 4:
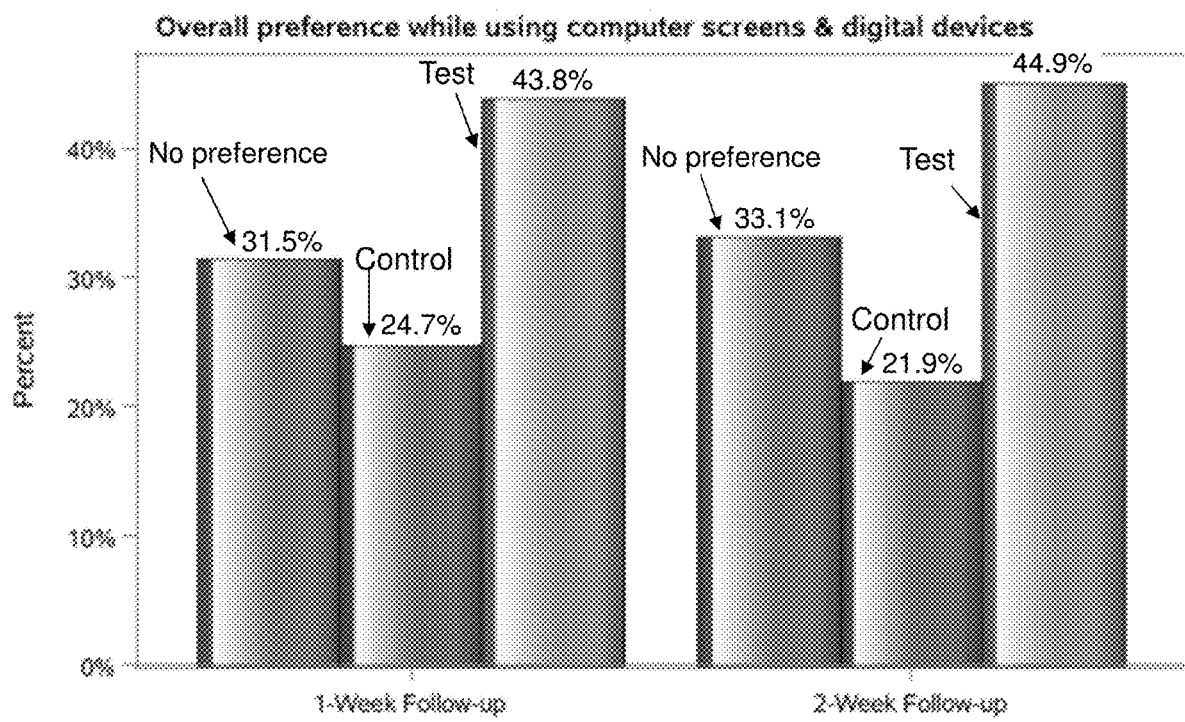
FIG. 4 shows a graph summarizing preferences as to overall preference of subjects in the study using computer screens and digital devices for subjects in the study.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

Unless defined otherwise, all technical and scientific terms used herein have the same meaning as commonly understood by one skilled in the art to which the disclosure belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [***]$_n$, is used to depict the number of repeating units in a polymer's chemical formula, the formula should be interpreted to represent the number average molecular weight of the macromolecule.

The term "individual" includes humans and vertebrates.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultra-violet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

The lenses of the present invention may be comprised of silicone hydrogels or conventional hydrogels. Silicone hydrogels typically contain at least one hydrophilic monomer and at least one silicone-containing component that are covalently bound to one another in the cured device.

"Target macromolecule" means the macromolecule being synthesized from the reactive monomer mixture comprising monomers, macromers, prepolymers, cross-linkers, initiators, additives, diluents, and the like.

The term "polymerizable compound" means a compound containing one or more polymerizable groups. The term encompasses, for instance, monomers, macromers, oligomers, prepolymers, cross-linkers, and the like.

"Polymerizable groups" are groups that can undergo chain growth polymerization, such as free radical and/or cationic polymerization, for example a carbon-carbon double bond which can polymerize when subjected to radical polymerization initiation conditions. Non-limiting examples of free radical polymerizable groups include (meth)acrylates, styrenes, vinyl ethers, (meth)acrylamides, N-vinyllactams, N-vinylamides, O-vinylcarbamates, O-vinylcarbonates, and other vinyl groups. Preferably, the free radical polymerizable groups comprise (meth)acrylate, (meth)acrylamide, N-vinyl lactam, N-vinylamide, and styryl functional groups, and mixtures of any of the foregoing. More preferably, the free radical polymerizable groups comprise (meth)acrylates, (meth)acrylamides, and mixtures thereof. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted).

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

A "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent. A "hydrophobic component" is a monomer, macromer, prepolymer, initiator, cross-linker, additive, or polymer which is slightly soluble or insoluble in deionized water at 25° C.

A "macromolecule" is an organic compound having a number average molecular weight of greater than 1500, and may be reactive or non-reactive.

A "macromonomer" or "macromer" is a macromolecule that has one group that can undergo chain growth polymerization, and in particular, free radical polymerization, thereby creating a repeating unit in the chemical structure of the target macromolecule. Typically, the chemical structure of the macromer is different than the chemical structure of the target macromolecule, that is, the repeating unit of the macromer's pendent group is different than the repeating unit of the target macromolecule or its mainchain. The difference between a monomer and a macromer is merely one of chemical structure, molecular weight, and molecular weight distribution of the pendent group. As a result, and as used herein, the patent literature occasionally defines monomers as polymerizable compounds having relatively low molecular weights of about 1,500 Daltons or less, which inherently includes some macromers. In particular, monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) may be referred to as monomers or macromers. Furthermore, the patent literature occasionally defines macromers as having one or more polymerizable groups, essentially broadening the common definition of macromer to include prepolymers. As a result, and as used herein, di-functional and multi-functional macromers, prepolymers, and crosslinkers may be used interchangeably.

A "silicone-containing component" is a monomer, macromer, prepolymer, cross-linker, initiator, additive, or polymer in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers used during polymerization.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-azobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "cross-linking agent" is a di-functional or multi-functional monomer or macromer which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers which contains remaining polymerizable groups capable of undergoing further reaction to form a polymer.

A "polymeric network" is a cross-linked macromolecule that can swell but cannot dissolve in solvents. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N, N-dimethylacrylamide ("DMA") or vinyl acetate. U.S. Pat. Nos. 4,436,887, 4,495, 313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

An "interpenetrating polymeric network" comprises two or more networks which are at least partially interlaced on the molecular scale but not covalently bonded to each other and which cannot be separated without braking chemical bonds. A "semi-interpenetrating polymeric network" comprises one or more networks and one or more polymers characterized by some mixing on the molecular level between at least one network and at least one polymer. A mixture of different polymers is a "polymer blend." A semi-interpenetrating network is technically a polymer blend, but in some cases, the polymers are so entangled that they cannot be readily removed.

"Reactive components" are the polymerizable compounds (such as monomers, macromers, oligomers, prepolymers, and cross-linkers) in the reactive mixture (defined below), as well as any other components in the reactive mixture which are intended to substantially remain in the resultant polymeric network after polymerization and all work-up steps (such as extraction steps) and packaging steps have been completed. Reactive components may be retained in the polymeric network by covalent bonding, hydrogen bonding, electrostatic interactions, the formation of interpenetrating polymeric networks, or any other means. Components that are intended to release from the polymeric network once it is in use are still considered "reactive components." For example, pharmaceutical or nutraceutical components in a contact lens which are intended to be released during wear are considered "reactive components." Components that are intended to be removed from the polymeric network during the manufacturing process (e.g., by extraction), such as diluents, are not "reactive components."

The terms "reactive mixture" and "reactive monomer mixture" refer to the mixture of components which are mixed together and, when subjected to polymerization conditions, result in formation of a polymeric network (such as conventional or silicone hydrogels) as well as biomedical devices, ophthalmic devices, and contact lenses made therefrom. The reactive mixture comprises reactive components. The reactive mixture may also contain other components which are intended to be removed from the device prior to its use, such as diluents. It will be appreciated that a wide range of additives may be added based upon the contact lens which is made and its intended use. Concentrations of components of the reactive mixture are expressed as weight percentages of all reactive components in the reactive mixture, therefore excluding diluents. When diluents are used, their concentrations are expressed as weight percentages based upon the amount of all components in the reactive mixture (including the diluent).

The term "silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer content to transmit oxygen to the eye.

The term "multi-functional" refers to a component having two or more polymerizable groups. The term "mono-functional" refers to a component having one polymerizable group.

The terms "halogen" or "halo" indicate fluorine, chlorine, bromine, and iodine.

"Alkyl" refers to an optionally substituted linear or branched alkyl group containing the indicated number of carbon atoms. If no number is indicated, then alkyl (including any optional substituents on alkyl) may contain 1 to 16 carbon atoms. Preferably, the alkyl group contains 1 to 10 carbon atoms, alternatively 1 to 8 carbon atoms, alternatively 1 to 6 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, thioalkyl, carbamate, carbonate, halogen, phenyl, benzyl, and combinations thereof. "Alkylene" means a divalent alkyl group, such as —$CH_2$—, —$CH_2CH_2$—, —$CH_2CH_2CH_2$—, —$CH_2CH(CH_3)CH_2$—, and —$CH_2CH_2CH_2CH_2$—.

"Haloalkyl" refers to an alkyl group as defined above substituted with one or more halogen atoms, where each halogen is independently F, Cl, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as —$CF_3$— or —$CF_2CF_3$—. "Haloalkylene" means a divalent haloalkyl group, such as —$CH_2CF_2$—.

"Cycloalkyl" refers to an optionally substituted cyclic hydrocarbon containing the indicated number of ring carbon atoms. If no number is indicated, then cycloalkyl may contain 3 to 12 ring carbon atoms. Preferred are $C_3$-$C_8$ cycloalkyl groups, $C_3$-$C_7$ cycloalkyl, more preferably $C_4$-$C_7$ cycloalkyl, and still more preferably $C_5$-$C_6$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, thioalkyl, amido, carbamate, carbonate, halo, phenyl, benzyl, and combinations thereof. "Cycloalkylene" means a divalent cycloalkyl group, such as 1,2-cyclohexylene, 1,3-cyclohexylene, or 1,4-cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an optionally substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, thioalkyl, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Thioalkyl" means an alkyl group attached to the parent molecule through a sulfur bridge. Examples of thioalkyl groups include, for instance, methylthio, ethylthio, n-propylthio and iso-propylthio. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as —CH$_2$CH$_2$NH—.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., —[Si—O]$_r$—, where n is 2 or more). Each silicon atom in the siloxanyl group is substituted with independently selected R$^A$ groups (where R$^A$ is as defined in formula A options (b)-(i)) to complete their valence.

"Silyl" refers to a structure of formula R$_3$Si— and "siloxy" refers to a structure of formula R$_3$Si—O—, where each R in silyl or siloxy is independently selected from trimethylsiloxy, C$_1$-C$_8$ alkyl (preferably C$_1$-C$_3$ alkyl, more preferably ethyl or methyl), and C$_3$-C$_8$ cycloalkyl.

"Alkyleneoxy" refers to groups of the general formula -(alkylene-O)$_p$— or —(O-alkylene)$_p$-, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., HO—[CH$_2$CH$_2$O]$_p$— or CH$_3$O—[CH$_2$CH$_2$O]$_p$—). Examples of alkyleneoxy include polyethyleneoxy, polypropyleneoxy, polybutyleneoxy, and poly(ethyleneoxy-co-propyleneoxy).

"Oxaalkylene" refers to an alkylene group as defined above where one or more non-adjacent CH$_2$ groups have been substituted with an oxygen atom, such as —CH$_2$CH$_2$OCH(CH$_3$)CH$_2$—. "Thiaalkylene" refers to an alkylene group as defined above where one or more non-adjacent CH$_2$ groups have been substituted with a sulfur atom, such as —CH$_2$CH$_2$SCH(CH$_3$)CH$_2$—.

The term "linking group" refers to a moiety that links a polymerizable group to the parent molecule. The linking group may be any moiety that is compatible with the compound of which it is a part, and that does not undesirably interfere with the polymerization of the compound, is stable under the polymerization conditions as well as the conditions for the processing and storage of the final product. For instance, the linking group may be a bond, or it may comprise one or more alkylene, haloalkylene, amide, amine, alkyleneamine, carbamate, ester (—CO$_2$—), arylene, heteroarylene, cycloalkylene, heterocycloalkylene, alkyleneoxy, oxaalkylene, thiaalkylene, haloalkyleneoxy (alkyleneoxy substituted with one or more halo groups, e.g., —OCF$_2$—, —OCF$_2$CF$_2$—, —OCF$_2$CH$_2$—), siloxanyl, alkylenesiloxanyl, or combinations thereof. The linking group may optionally be substituted with 1 or more substituent groups. Suitable substituent groups may include those independently selected from alkyl, halo (e.g., fluoro), hydroxyl, HO-alkyleneoxy, MeO-alkyleneoxy, siloxanyl, siloxy, siloxy-alkyleneoxy-, siloxy-alkylene-alkyleneoxy-(where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate (in addition to the polymerizable group to which the linking group is linked).

Preferred linking groups include C$_1$-C$_8$ alkylene (preferably C$_2$-C$_6$ alkylene) and C$_1$-C$_8$ oxaalkylene (preferably C$_2$-C$_6$ oxaalkylene), each of which is optionally substituted with 1 or 2 groups independently selected from hydroxyl and siloxy. Preferred linking groups also include carboxylate, amide, C$_1$-C$_8$ alkylene-carboxylate-C$_1$-C$_8$ alkylene, or C$_1$-C$_8$ alkylene-amide-C$_1$-C$_8$ alkylene.

When the linking group is comprised of combinations of moieties as described above (e.g., alkylene and cycloalkylene), the moieties may be present in any order. For instance, if in Formula E below, L is indicated as being -alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg or Pg) to which the linking group is attached. For example, if in Formula E, L and L$^2$ are indicated as both being alkylene-cycloalkylene, then Rg-L is preferably Rg-alkylene-cycloalkylene- and -L$^2$-Rg is preferably -cycloalkylene-alkylene-Rg.

The term "electron withdrawing group" (EWG) refers to a chemical group which withdraws electron density from the atom or group of atoms to which the electron withdrawing group is attached. Examples of EWGs include, but are not limited to, cyano, amide, ester, keto, or aldehyde. A preferred EWG is cyano (CN).

The terms "high energy visible light absorbing compound" or "HEV light absorbing compound" refer to chemical materials that absorb one or more wavelengths of high energy visible light, for instance in the range of 400 to 450 nm. A material's ability to absorb certain wavelengths of light can be determined by measuring its UV/Vis transmission spectrum. Compounds that exhibit no absorption at a particular wavelength will exhibit substantially 100 percent transmission at that wavelength. Conversely, compounds that completely absorb at a particular wavelength will exhibit substantially 0% transmission at that wavelength. As used herein, if the amount of a contact lens's transmission is indicated as a percentage across a particular wavelength range, it is to be understood that the contact lens exhibits the percent transmission at all wavelengths across that range. For purposes of the invention, a material that has a transmission of greater than 80 percent across the wavelength range of 400 to 450 nm is not an HEV light absorbing material.

The terms "photostable," "photostability," or similar expressions mean that a contact lens (containing an HEV light absorbing compound) doesn't exhibit a substantial change in its visible light transmission spectrum after exposure to light, when packaged in a clear blister pack, under conditions of the International Conference on Harmonisation (ICH) of Technical Requirements for Registration of Pharmaceuticals for Human Use guideline, Q1B Photostability Testing of New Drug Substances and Products, published on November 1996. Preferably, the exposure is conducted under the ICH Photostability Guideline using an Option 2 light source with an estimated illuminance exposure of $1.5192 \times 10^6$ Lux hours (168.8 hours exposure time) and an estimated ultraviolet irradiation exposure of 259.4 Watt hours/m$^2$ (16.2 hours exposure time), preferably in a photostability chamber that is controlled at 25° C./Amb RH. When lenses are measured within a blister pack, the blister pack is exposed foil side down to maximize irradiance from the light source during photo exposure. After exposure, the UV/Vis spectrum of the test lens is collected and compared to a control lens (a lens that was not subjected to Q1B conditions). Photostability may be represented as the percent change in average transmission of the test lens relative to the control lens at a selected wavelength range. The change may be calculated as the absolute value of the difference in the average transmission (over the selected wavelength range) between the control lens and the test lens, divided by the average transmission of the control lens (at the selected wavelength range). For purposes of this invention, a contact lens is considered to be photostable if the change in average transmission over the selected wavelength range (e.g., 380 to 450 nm) is 20 percent or less, or 15 percent or less, or 10 percent or less, or 7 percent or less, or 5 percent or less, or 2 percent or less. The measurement may, for instance, be made on a −1.00 diopter contact lens.

The term "photochromic compound" refers to a material which reversibly changes its absorption properties (i.e. color) caused by a photochemical reaction within the material upon exposure to specific wavelengths of electromagnetic radiation. By way of example, a photochromic compound may exhibit a reversible change in average transmission of 5% or more, or 10% or more, or 20% percent or more, in the visible portion of the electromagnetic spectrum (e.g., in the wavelength range of about 380 nm to about 760 nm) when exposed to UV or HEV light. A "static compound" is a material that is not photochromic, thus the material does not undergo a photochemical reaction that reversibly changes its color.

Unless otherwise indicated, ratios, percentages, parts, and the like are by weight.

Unless otherwise indicated, numeric ranges, for instance as in "from 2 to 10," are inclusive of the numbers defining the range (e.g., 2 and 10).

It is understood that mention of percentages in this disclosure refer to averages, unless otherwise specified. In other words, there could be a 30% rate of a study endpoint and only one third of patients achieving that endpoint after treatment or use of the device of this disclosure.

It must also be noted that, as used in the specification and the appended claims, the singular forms "a," "an" and "the" include plural referents unless the context clearly dictates otherwise. By "comprising" or "containing" or "including" it is meant that at least the named compound, element, particle, or method step is present in the composition or article or method, but does not exclude the presence of other compounds, materials, particles, method steps, even if the other such compounds, material, particles, method steps have the same function as what is named.

It must also be noted that the word "about" includes minor deviations from the recited numerical range, such as standard deviations which might be observed when measuring multiple samples in a test method.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

The term "safety" or "clinical safety" or "clinically safe", as it relates to a contact lens or related method of use, refers to a lens that exhibits zero lens related, ocular adverse events.

The term "adverse event" (AE) is any untoward (unwanted) medical occurrence in a patient or clinical investigation subject administered a test article, study treatment or study procedure whether or not caused by the test article, study treatment or procedure. An AE can therefore be anything not present prior to the study, but appeared or reappeared following initiation of the study; anything present prior to the study, but worsened during the study. This can include any condition resulting from concomitant illnesses, reactions to concomitant medications, or progression of disease states. Pregnancy was documented in the study of this disclosure as an adverse event and was reported to the clinical monitor immediately upon learning of the event.

A qualitative assessment of the degree of intensity of an adverse event can be made irrespective of test article, study treatment or study procedure relationship or seriousness of the event and evaluated according to the following scale:

Mild—Event is noticeable to the subject, but is easily tolerated and does not interfere with the subject's daily activities;

Moderate—Event is bothersome, possible requiring additional therapy, and may interfere with the subject's daily activities; and Severe—Event is intolerable, necessitates additional therapy or alteration of therapy and interferes with the subject's daily activities.

The term "serious adverse event" (SAE) can mean death, serious deterioration in the health of the subject that resulted in any life-threatening illness or injury, permanent or persistent impairment of a body structure or a body function, hospitalization or prolongation of patient hospitalization, medical or surgical intervention to prevent life-threatening illness or injury or permanent impairment to a body structure or a body function, chronic disease, fetal distress, fetal death or a congenital physical or mental impairment of birth defect. Diagnoses and conditions that are considered Ocular Serious Adverse Events include, but not limited to Microbial Keratitis (MK), Iritis (including cells in the anterior chamber), permanent decrease in best spectacle corrected visual acuity equivalent to 2 acuity lines or greater, Central Corneal Opacity, Central Corneal Neovascularization, Uveitis, Endophthalmitis, Hypopyon, Hyphemia, Penetration of Bowman's Membrane, Persistent Epithelial Defect, and Limbal cell Damage leading to Conjunctivalization.

The term "significant adverse event" can mean events that are symptomatic and warrant discontinuation (temporary or permanent) of the contact lens wear. Diagnoses and conditions that are considered Ocular Significant Adverse Events (e.g., include, but not limited to Contact Lens Induced Peripheral Ulcer (CLPU), Significant Infiltrative Events (SIE), Superior Epithelial Arcuate Lesions (SEALs), Any Temporary Loss of >2 Lines of BSCVA, other grade 3 or higher corneal findings, such as abrasions or edema, non-contact lens related corneal events—e.g. Epidemic Keratoconjunctivitis (EKC), asymptomatic corneal scar, and any corneal event which necessitates temporary lens discontinuation >2 weeks.

The term "non-Significant Adverse Events" can mean those events that are usually asymptomatic and usually do not warrant discontinuation of contact lens wear but may cause a reduction in wear time. Diagnoses and conditions that are considered Ocular Non-Significant Adverse Events include, but not limited to the following Non-significant Infiltrative Event (NSIE), Contact Lens Papillary Conjunctivitis (CLPC), Superficial Punctate Keratitis (SPK), Conjunctivitis: Bacterial, Viral, Allergic, Blepharitis, Meibomianitis, Contact Dermatitis, Localized Allergic Reactions, and any corneal event not explicitly defined as serious or significant adverse event, which necessitates temporary lens discontinuation <2 weeks.

The term "Adverse Device Effect" can mean an adverse event related to the use of an investigational medical device.

The term "Unanticipated Adverse Device Effect" can mean any serious adverse effect on health or safety or any life-threatening problem or death caused by, or associated with, the test article, if that effect, problem, or death was not previously identified in nature, severity, or degree of incidence in the investigational plan, Investigator's Brochure or protocol, or any other unanticipated serious problem associated with the test article that relates to the rights, safety and welfare of subjects.

Unless otherwise noted, the term "clinically effective" (used independently or to modify the term "effective") can mean that it has been proven by a clinical trial wherein the clinical trial has met the approval standards of U.S. Food and Drug Administration, EMEA or a corresponding national regulatory agency. For example, a clinical study may be an adequately sized, randomized, double-blinded controlled study used to clinically prove the effects of the device and related systems of this disclosure. Most preferably to clinically prove the effects of the contact lens, for example, to achieve a clinically effective outcome in for the patient experiencing the condition and/or achieve a clinical benefit or improvement afflicted by said condition.

The present disclosure relates to contact lenses which exhibit a number of beneficial clinical attributes in a contact lens wearer, such as overall comfort overall preference of the contact lens while using computer screens and digital devices as observed by the contact lens wearer, comfort at the end of the day, CLUE Comfort score, CLUE Vision score, and clarity of vision while driving at night. Thus, according to a first aspect, the invention provides a contact lens exhibiting a beneficial clinical attribute selected from overall comfort, overall preference of the contact lens while using computer screens and digital devices as observed by the contact lens wearer, comfort at the end of the day, CLUE Comfort score, CLUE Vision score, and clarity of vision while driving at night.

The contact lens may transmit from 0 percent to 70 percent, or from 1 to 70 percent, of light across a wavelength range of 400 to 409 nm. The transmission of the contact lens across the 400 to 409 nm wavelength range may be at least 2 percent, or at least 3 percent, or at least 4 percent. The transmission of the contact lens across the 400 to 409 nm range may be up to 60 percent, or up to 50 percent, or up to 40 percent, or up to 30 percent, or up 20 percent.

The contact lens may transmit 10 percent or less of light across a wavelength range of 200 to 279 nm. The transmission of the contact lens across the 200 to 279 nm wavelength range may be 5 percent or less or 1 percent or less, or less than 1 percent.

The contact lens may transmit 45 percent or less of light across a wavelength range of 280 to 399 nm. The transmission of the contact lens across 280 to 399 nm wavelength range may be 35 percent or less, or 25 percent or less, or 20 percent or less, or 10 percent or less, or 5 percent or less, or 1 percent or less.

The contact lens may transmit at least 10 percent of light across a wavelength range of 410 to 424 nm. The transmission of the contact lens across the 410 to 424 nm wavelength range may be at least 15 percent. The transmission of the contact lens across the 410 to 424 nm wavelength range may be up to 95 percent, up to 85 percent, up to 75 percent, or up 65 percent.

The contact lens may transmit at least 50 percent of light across a wavelength range of 425 to 449 nm. The transmission of the contact lens across the 425 to 449 nm range may be at least 60 percent.

The contact lens may transmit at least 80 percent of light across a wavelength range of 450 to 800 nm. The transmission of the contact lens across the 450 to 800 nm wavelength range may be at least 85 percent.

The contact lens may transmit from 1 to 70 percent of light across a wavelength range of 400 to 409 nm; and 45 percent or less of light across a wavelength range of 280 to 399 nm.

The contact lens may transmit from 1 to 70 percent of light across a wavelength range of 400 to 409 nm; 45 percent or less of light across a wavelength range of 280 to 399 nm; and at least 80 percent of light across a wavelength range of 450 to 800 nm.

The contact lens may transmit from 1 to 70 percent of light across a wavelength range of 400 to 409 nm; 45 percent or less of light across a wavelength range of 280 to 399 nm; from 10 to 95 percent of light across a wavelength range of 410 to 424 nm; at least 50 percent of light across a wavelength range of 425 to 449 nm; and at least 80 percent of light across a wavelength range of 450 to 800 nm.

The contact lens may be a soft hydrogel contact lens, preferably a silicone hydrogel contact lens. The foregoing transmission wavelengths and percentages may be measured on various thicknesses of lenses. For example, the center thickness may be from 70 to 300 microns, or from 80 to 230 microns, or from 80 to 110 microns, or from 90 to 110 microns. The concentration of the one or more high energy visible light absorbing compounds may be adjusted to achieve the foregoing transmission properties. For instance, the concentration may be in the range of at least 0.01 percent, or at least 0.1 percent, or at least 1 percent, or at least 2 percent; and up to 10 percent or up to 5 percent, based on the weight percentages of all components in the reactive mixture, excluding diluent. A typical concentration may be in the range of 1 to 5 percent.

The HEV light absorbing compound for use in the contact lenses of the invention may be a compound of formula I:

15

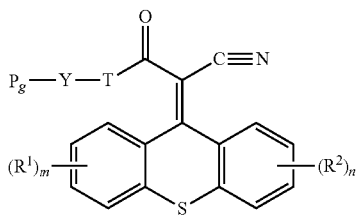

Formula I wherein:
m and n are independently 0, 1, 2, 3, or 4;
T is a bond, O, or NR;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring. Compounds of formula I preferably contain one or two Y—$P_g$ groups. More preferably, the compounds contain one Y—$P_g$ group.

I-1. Compounds of formula I may include compounds of formula I-1, which are compounds of formula I wherein m and n are independently 0 or 1, or alternatively both are 0.

I-2. Compounds of formulae I and I-1 may include compounds of formula I-2, which are compounds of formula I, or I-1 wherein m is 1 and $R^1$ is $C_1$-$C_6$ alkyl, preferably ethyl or methyl.

I-3. Compounds of formulae I, I-1, and I-2 may include compounds of formula I-3, which are compounds of formula I, I-1, or I-2 wherein n is 1 and $R^2$ is $C_1$-$C_6$ alkyl, preferably ethyl or methyl.

I-4. Compounds of formulae I, I-1, I-2, and I-3 may include compounds of formula I-4, which are compounds of formula I, I-1, I-2, or I-3 wherein R is H, or $C_1$-$C_6$ alkyl. Preferably, R in the group T is H.

I-5. Compounds of formulae I, I-1, I-2, I-3, and I-4 may include compounds of formula I-5, which are compounds of formula I, I-1, I-2, I-3, or I-4 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components generally used in making contact lenses. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

I-6. Compounds of formulae I, I-1, I-2, I-3, I-4, and I-5 may include compounds of formula I-6, which are compounds of formula I, I-1, I-2, I-3, I-4, or I-5 wherein Y (a linking group) is alkylene, cycloalkylene, heterocycloalkylene, arylene (e.g., phenylene), heteroarylene, oxaalkylene, alkylene-amide-alkylene, alkylene-amine-alkylene,

16 or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene (—$CH_2CH_2$—). When T in the compound of formula I is O, it is preferred that the carbon atom of the linking group to which the O is attached be hindered. For instance, if T is O and Y is alkylene, a preferred alkylene is —$C(R^H)_2(CH_2)_x$—, where $R^H$ is independently $C_1$-$C_6$ alkyl (preferably independently methyl or ethyl) and x is from 1 to 5.

I-7. Compounds of formulae I, I-1, I-2, I-3, I-4, I-5, and I-6 may include compounds of formula I-7, which are compounds of formula I, I-1, I-2, I-3, I-4, I-5, or I-6 wherein T is a bond or is NR (preferably NH).

Compounds of formula I may include compounds of formula II:

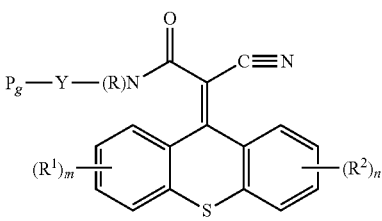

Formula II wherein:
m and n are independently 0, 1, 2, 3, or 4;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring. Compounds of formula II preferably contain one or two Y—$P_g$ groups. More preferably, the compounds contain one Y—$P_g$ group.

II-1. Compounds of formulae II may include compounds of formula II-1, which are compounds of formula II wherein m and n are independently 0 or 1, or alternatively both are 0.

II-2. Compounds of formulae II, and II-1 may include compounds of formula II-2, which are compounds of formula II, or II-1 wherein m is 1 and $R^1$ is $C_1$-$C_6$ alkyl, preferably ethyl or methyl.

II-3. Compounds of formulae II, II-1, and II-2 may include compounds of formula II-3, which are compounds of formula II, II-1, or II-2 wherein n is 1 and $R^2$ is $C_1$-$C_6$ alkyl, preferably ethyl or methyl.

II-4. Compounds of formulae II, II-1, II-2, and II-3 may include compounds of formula II-4, which are compounds of formula II, II-1, II-2, or II-3 wherein R at each occurrence is independently H, or $C_1$-$C_6$ alkyl. Preferably, R at each occurrence is H. Preferably R in the group T is H.

II-5. Compounds of formulae II, II-1, II-2, II-3, and II-4 may include compounds of formula II-5, which are compounds of formula II, II-1, II-2, II-3, or II-4 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components generally used in making polymeric devices. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

II-6. Compounds of formulae II, II-1, II-2, II-3, II-4, and II-5 may include compounds of formula II-6, which are compounds of formula II, II-1, II-2, II-3, II-4, or II-5 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene (—$CH_2CH_2$—).

Specific examples of compounds of formula I include, but are not limited to, the compounds shown in Table 1.

TABLE 1

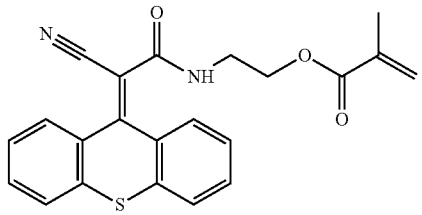

2-(2-cyano-2-(9H-thioxanthen-9-ylidene)acetamido)ethyl methacrylate

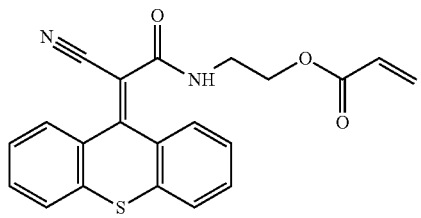

2-(2-cyano-2-(9H-thioxanthen-9-ylidene)acetamido)ethyl acrylate

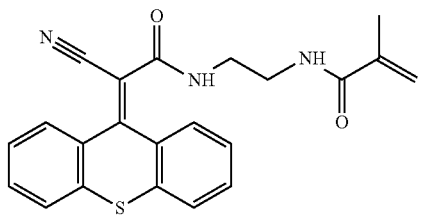

N-(2-(2-cyano-2-(9H-thioxanthen-9-ylidene)acetamido)ethyl)methacrylamide

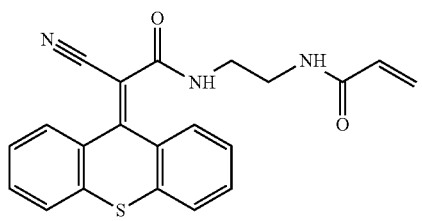

N-(2-(2-cyano-2-(9H-thioxanthen-9-ylidene)acetamido)ethyl)acrylamide

TABLE 1-continued

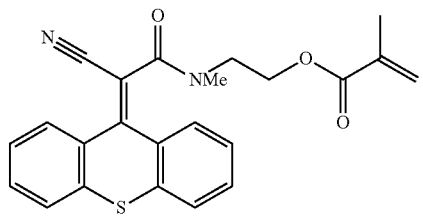

2-(2-cyano-N-methyl-2-(9H-thioxanthen-9-ylidene)acetamido)ethyl methacrylate

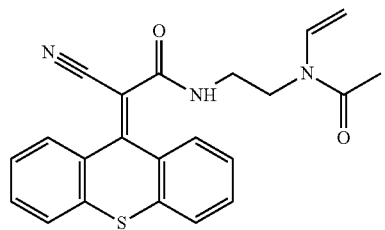

2-cyano-2-(9H-thioxanthen-9-ylidene)-N-(2-(N-vinylacetamido)ethyl acetamide

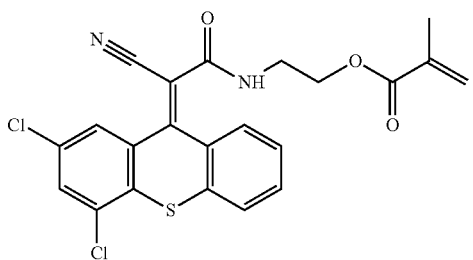

(E)-2-(2-cyano-2-(2,4-dichloro-9H-thioxanthen-9-ylidene)acetamido)ethyl methacrylate

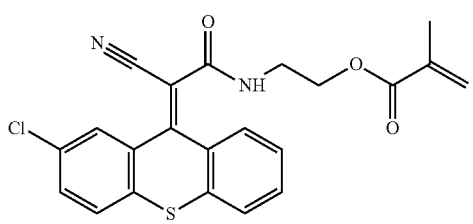

(E)-2-(2-(2-chloro-9H-thioxanthen-9-ylidene)-2-cyanoacetamido)ethyl methacrylate

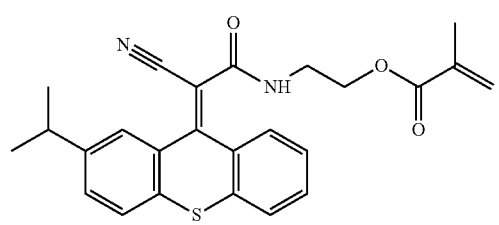

(E)-2-(2-cyano-2-(2-isopropyl-9H-thioxanthen-9-ylidene)acetamido)ethyl methacrylate TABLE 1-continued

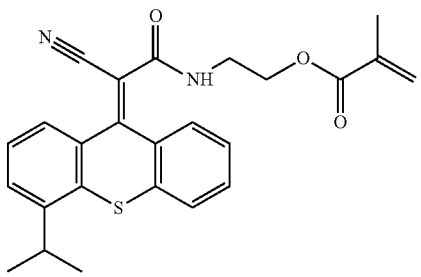

(E)-2-(2-cyano-2-(4-isopropyl-9H-thioxanthen-9-ylidene)acetamido)ethyl methacrylate

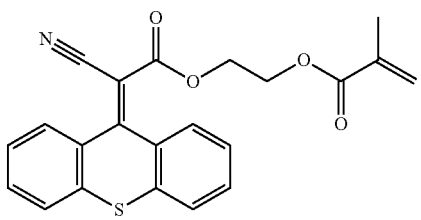

2-(2-cyano-2-(9H-thioxanthen-9-ylidene)acetoxy)ethyl methacrylate

High energy visible (HEV) light absorbing compounds for use in the invention are preferably photostable. Thus, contact lenses of the invention, containing HEV light absorbing compounds, preferably exhibit 20% or less, alternatively 15% or less, alternatively 10% or less, alternatively 7% or less, alternatively 5% or less, or alternatively 2% or less of change in their average transmission over a wavelength range of 380 to 450 nm, following exposure under ICH Q1B conditions, compared to a control lens.

Contact lenses of the invention may comprise other absorbing compounds, in addition to HEV light absorbing compounds, to provide desirable absorption characteristics. For example, preferred compositions may comprise an HEV light absorbing compound and a compound that absorbs UV. Suitable UV absorbing compounds are known in the art, and fall into several classes which include, but are not limited to, benzophenones, benzotriazoles, triazines, substituted acrylonitriles, salicyclic acid derivatives, benzoic acid derivatives, cinnamic acid derivatives, chalcone derivatives, dypnone derivatives, crotonic acid derivatives, or any mixtures thereof. A preferred class of UV absorbing compound is benzotriazoles, such as Norbloc (2-(2'-hydroxy-5-methacrylyloxyethylphenyl)-2H-benzotriazole).

A particularly preferred composition comprises 2-(2-cyano-2-(9H-thioxanthen-9-ylidene)acetamido)ethyl methacrylate and a UV absorbing compound, such as a benzotriazole, for instance (2-(2'-hydroxy-5-methacrylyloxyethylphenyl)-2H-benzotriazole).

Compounds of formula I may be prepared by those skilled in the art using literature methods. By way of example, various compounds of formula I may be prepared as shown in Scheme 1 and the associated description. Exemplary reagents and procedures for these reactions appear in the working examples.

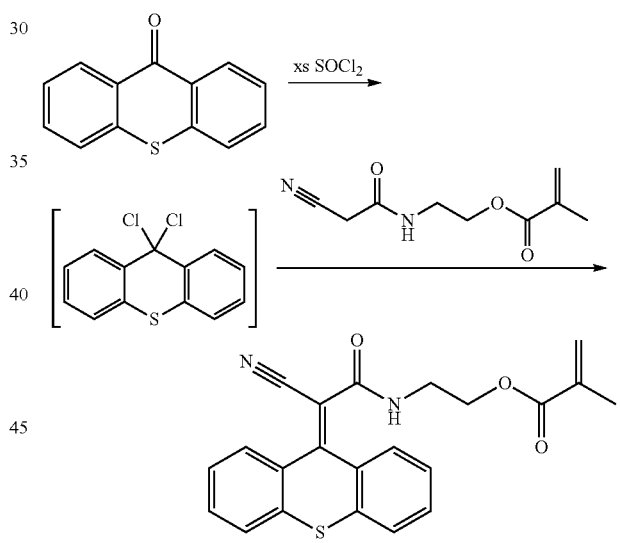

SCHEME 1

Scheme 1 shows a method for preparing exemplary compounds of the invention. Thus, the carbonyl moiety of the starting material is converted to a reactive dihalide intermediate, which is further reacted with the active methylene compound without further purification or isolation. The reaction mixture is protected from air and moisture until completion of the reaction with the cyanomethyl amide derivative. Other compounds of the invention may be prepared by those skilled in the art using analogous procedures to those shown in Scheme 1 with appropriate substitution of reagents.

High energy visible light absorbing compounds, such as the compounds of formula I, may be included in reactive mixtures to form contact lenses. Generally, the high energy visible light absorbing compounds can be present in any amount, typically up to the limit of their solubility. For instance, the compounds may be present in an amount in the range of about 0.1% to about 10% by weight, or from about 0.5 to about 5% by weight, or from about 0.75% to about 4% by weight. The upper limit is typically determined by the solubility of the compound with other co-monomers and or diluents in the reactive monomer mix.

A variety of contact lenses may be prepared, including hard contact lenses and soft contact lenses. Preferably, the contact lens is a soft contact lens, which may be made from conventional or silicone hydrogel formulations. Contact lenses may be multifocal, having multiple prescriptions in one lens. Contact lenses may be toric, such as a toric hydrogel contact lens or a toric silicone hydrogel contact lens. Multifocal or toric lenses may be used to correct astigmatism in wearers needing astigmatism correction.

Contact lenses of the invention comprise a free radical reaction product of a reactive mixture containing one or more high energy visible (HEV) light absorbing compounds, such as compounds of formula I, one or more polymerizable compounds suitable for making the desired ophthalmic device (also referred to herein as device forming polymerizable compounds or hydrogel forming polymerizable compounds), and optional components. Thus, the reactive mixture may, for example, include, in addition to a high energy visible light absorbing compound as described above, one or more of: hydrophilic components, hydrophobic components, silicone-containing components, wetting agents such as polyamides, crosslinking agents, and further components such as diluents and initiators.

Hydrophilic Components

Examples of suitable families of hydrophilic monomers include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof.

Non-limiting examples of hydrophilic (meth)acrylate and (meth)acrylamide monomers include: acrylamide, N-isopropyl acrylamide, N,N-dimethylaminopropyl (meth)acrylamide, N,N-dimethyl acrylamide (DMA), 2-hydroxyethyl methacrylate (HEMA), 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, 2-aminoethyl (meth)acrylate, 3-aminopropyl (meth)acrylate, 2-aminopropyl (meth)acrylate, N-2-aminoethyl (meth)acrylamides), N-3-aminopropyl (meth)acrylamide, N-2-aminopropyl (meth)acrylamide, N,N-bis-2-aminoethyl (meth)acrylamides, N,N-bis-3-aminopropyl (meth)acrylamide), N,N-bis-2-aminopropyl (meth)acrylamide, glycerol methacrylate, polyethyleneglycol monomethacrylate, (meth)acrylic acid, vinyl acetate, acrylonitrile, and mixtures thereof.

Hydrophilic monomers may also be ionic, including anionic, cationic, zwitterions, betaines, and mixtures thereof. Non-limiting examples of such charged monomers include (meth)acrylic acid, N-[(ethenyloxy)carbonyl]-β-alanine (VINAL), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT), 1-propanaminium, N,N-dimethyl-N-[3-[(1-oxo-2-propen-1-yl) amino]propyl]-3-sulfo-, inner salt (SBT), 3,5-Dioxa-8-aza-4-phosphaundec-10-en-i-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), and methacryloyloxy)propyl) dimethylammonio)propane-1-sulfonate (MAPDAPS).

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-vinylimidazole, and mixtures thereof Non-limiting examples of hydrophilic O-vinyl carbamates and O-vinyl carbonates monomers include N-2-hydroxyethyl vinyl carbamate and N-carboxy-β-alanine N-vinyl ester. Further examples of hydrophilic vinyl carbonate or vinyl carbamate monomers are disclosed in U.S. Pat. No. 5,070,215. Hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, and 2-ethyl oxazoline.

The hydrophilic monomers may also be macromers or prepolymers of linear or branched poly(ethylene glycol), poly(propylene glycol), or statistically random or block copolymers of ethylene oxide and propylene oxide, having polymerizable moieties such as (meth)acrylates, styrenes, vinyl ethers, (meth)acrylamides, N-vinylamides, and the like. The macromers of these polyethers have one polymerizable group; the prepolymers may have two or more polymerizable groups.

The preferred hydrophilic monomers of the present invention are DMA, NVP, HEMA, VMA, NVA, and mixtures thereof. Preferred hydrophilic monomers include mixtures of DMA and HEMA. Other suitable hydrophilic monomers will be apparent to one skilled in the art.

Generally, there are no particular restrictions with respect to the amount of the hydrophilic monomer present in the reactive monomer mixture. The amount of the hydrophilic monomers may be selected based upon the desired characteristics of the resulting hydrogel, including water content, clarity, wettability, protein uptake, and the like. Wettability may be measured by contact angle, and desirable contact angles are less than about 100, less than about 80, and less than about 60°. The hydrophilic monomer may be present in an amount in the range of, for instance, about 0.1 to about 100 weight percent, alternatively in the range of about 1 to about 80 weight percent, alternatively about 5 to about 65 weight percent, alternatively in the range of about 40 to about 60 weight percent, or alternatively about 55 to about 60 weight percent, based on the total weight of the reactive components in the reactive monomer mixture.

Silicone-Containing Components

Silicone-containing components suitable for use in the invention comprise one or more polymerizable compounds, where each compound independently comprises at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above; one or more optionally repeating siloxane units; and one or more linking groups connecting the polymerizable groups to the siloxane units. The silicone-containing component may comprise: one or more polymerizable groups that are independently a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, an N-vinyl lactam, an N-vinylamide, a styryl, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, or mixtures of the foregoing; one or more optionally repeating siloxane units; and one or more linking groups connecting the polymerizable groups to the siloxane units.

Formula A. The silicone-containing component may comprise one or more polymerizable compounds of Formula A:

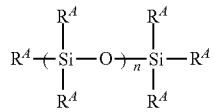

Formula A wherein:
at least one $R^A$ is a group of formula $R_g$-L- wherein $R_g$ is a polymerizable group and L is a linking group, and the remaining $R^A$ are each independently:
(a) $R_g$-L-,
(b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof,
(c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof,
(d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof,
(e) halo,
(f) alkoxy, cyclic alkoxy, or aryloxy,
(g) siloxy,
(h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or
(i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and
n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^A$ substituents and if different $R^A$ substituents are present, the n groups may be in random or block configuration.

In Formula A, three $R^A$ may each comprise a polymerizable group, alternatively two $R^A$ may each comprise a polymerizable group, or alternatively one $R^A$ may comprise a polymerizable group.

Examples of silicone-containing components suitable for use in the invention include, but are not limited to, compounds listed in Table 2. Where the compounds in Table 2 contain polysiloxane groups, the number of SiO repeat units in such compounds, unless otherwise indicated, is preferably from 3 to 100, more preferably from 3 to 40, or still more preferably from 3 to 20.

TABLE 2

| | |
|---|---|
| 1 | mono-methacryloxypropyl terminated mono-n-butyl terminated polydimethylsiloxanes (mPDMS) (preferably containing from 3 to 15 SiO repeating units) |
| 2 | mono-acryloxypropyl terminated mono-n-butyl terminated polydimethylsiloxane |
| 3 | mono(meth)acryloxypropyl terminated mono-n-methyl terminated polydimethylsiloxane |
| 4 | mono(meth)acryloxypropyl terminated mono-n-butyl terminated polydiethylsiloxane |
| 5 | mono(meth)acryloxypropyl terminated mono-n-methyl terminated polydiethylsiloxane |
| 6 | mono(meth)acrylamidoalkylpolydialkylsiloxanes |
| 7 | mono(meth)acryloxyalkyl terminated mono-alkyl polydiarylsiloxanes |
| 8 | 3-methacryloxypropyltris(trimethylsiloxy)silane (TRIS) |
| 9 | 3-methacryloxypropylbis(trimethylsiloxy)methylsilane |

TABLE 2-continued

| | |
|---|---|
| 10 | 3-methacryloxypropylpentamethyl disiloxane |
| 11 | mono(meth)acrylamidoalkylpolydialkylsiloxanes |
| 12 | mono(meth)acrylamidoalkyl polydimethylsiloxanes |
| 13 | N-(2,3-dihydroxypropane)-N'-(propyl tetra(dimethylsiloxy) dimethylbutylsilane)acrylamide |
| 14 | N-[3-tris(trimethylsiloxy)silyl]-propyl acrylamide (TRIS-Am) |
| 15 | 2-hydroxy-3-[3-methyl-3,3-di(trimethylsiloxy)silylpropoxy]-propyl methacrylate (SiMAA) |
| 16 | 2-hydroxy-3-methacryloxypropyloxypropyl-tris(trimethylsiloxy)silane |

17 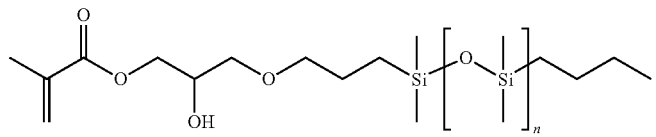

mono-(2-hydroxy-3-methacryloxypropyloxy)-propyl terminated mono-n-butyl terminated polydimethylsiloxanes (OH-mPDMS) (containing from 4 to 30, or from 4 to 20, or from 4 to 15 SiO repeat units)

18 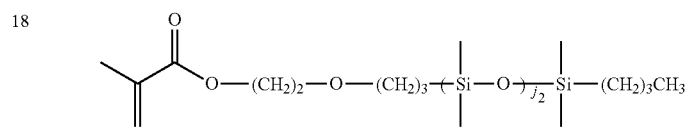

19 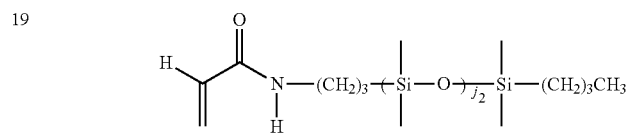

20 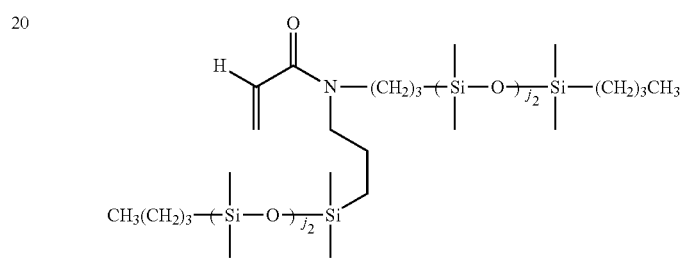

21 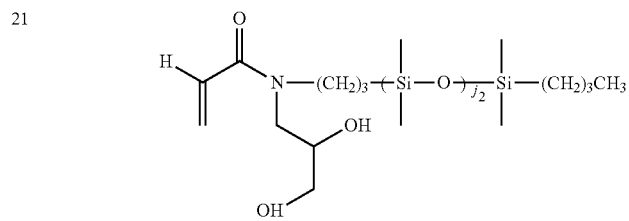

22 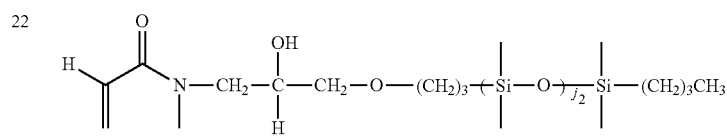

23 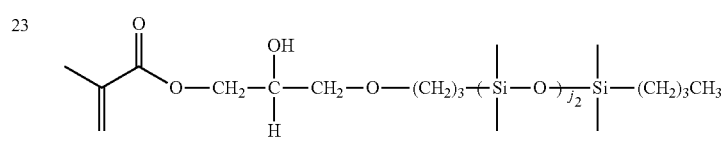

TABLE 2-continued

| | |
|---|---|
| 24 | 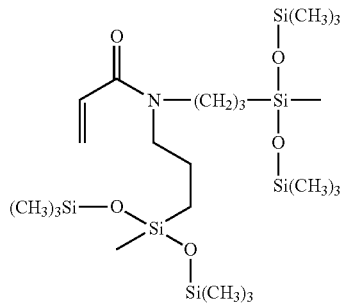 |
| | 15 |

Additional non-limiting examples of suitable silicone-containing components are listed in Table 3. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE 3

25: Structure with (CH₃)₃Si—O—Si(CH₃)—O—Si(CH₃)₃ and Si(CH₃)₃ groups attached to a carbon bearing CH₂—O—(CH₂)₃—Si(CH₃)—[O—Si(CH₃)₃]₂, linked via CH₂—NH—C(=O)—C(=CH₂)CH₃ (methacrylamide)

26: Methacrylate—O—(CH₂CH₂O)ₚ—C(=O)—NH—CH₂—[isophorone diisocyanate residue]—NH—C(=O)—O—(CH₂)₂—Si(CH₃)₂—[O—Si(CH₃)₂]_{f2}—(CH₂)₃CH₃

27: Bis-methacrylate terminated siloxane: CH₃—C(=O)—O—(CH₂)₃—Si(CH₃)₂—[O—Si(CH₃)₂]_{f1}—[linking (CH₂)₃—(OCH₂CH₂)ₚ—OCH₃ groups]—Si(CH₃)₂—(CH₂)₃—O—C(=O)—CH₃ with (CH₂O—CH₂CH₂O)ₚ substituent; p is 5-10

28: CH₃—C(=O)—O—(CH₂)₂—NH—C(=O)—O—(CH₂)₂—O—(CH₂)₃—Si(CH₃)₂—[O—Si(CH₃)₂]_{f2}—(CH₂)₃CH₃ p is 1 to 10

TABLE 3-continued

| | |
|---|---|
| 29 | (structure: 3-vinylphenyl ether with -(CH₂)₃-[Si(CH₃)₂-O]_{j2}-Si(CH₃)₂-(CH₂)₃CH₃) |
| 30 | 1,3-bis[4-(vinyloxycarbonyloxy)but-1-yl]tetramethyl-disiloxane |
| 31 | 3-(vinyloxycarbonylthio) propyl-[tris (trimethylsiloxy)silane] |
| 32 | 3-[tris(trimethylsiloxy)silyl] propyl allyl carbamate |
| 33 | 3-[tris(trimethylsiloxy)silyl] propyl vinyl carbamate |
| 34 | tris(trimethylsiloxy)silylstyrene (Styryl-TRIS) |
| 35 | (methacrylate structure with -O-(CH₂)₂NHCO(CH₂)₂O(CH₂)₃-Si-O-[Si-O]_n-Si-(CH₂)₃O-CH₂-CH₂-O-(CH₂)₂NHC(O)-O- linking to methacrylate; with R^A side group) $R^A = CH_3$ (a) or $CH_2CH_2CF_3$ (b) or $CH_2-(CH_2)_2-[OCH_2CH_2]_{1-10}-OCH_3$ (c); $a + b + c = n$ |
| 36 | (bis-acrylate glycerol ether siloxane structure) |
| 37 | (bis-vinyl carbonate siloxane structure with -(CH₂)₄-Si-[O-Si(CH₃)₂]_{j2}-O-Si-(CH₂)₄-) |

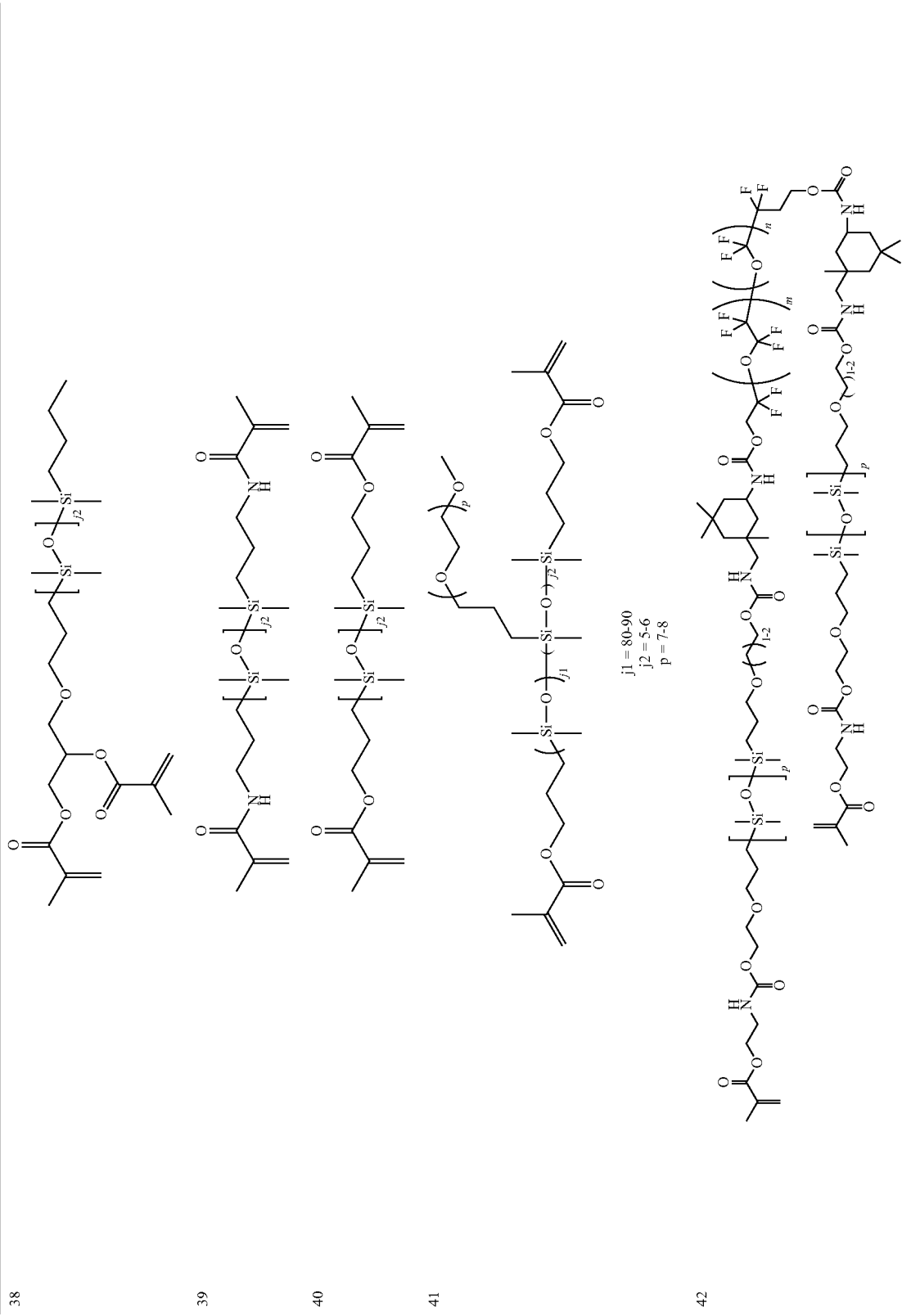

TABLE 3-continued
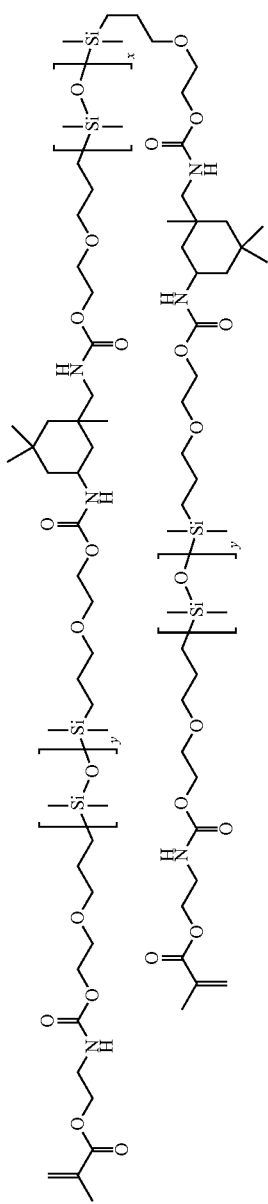
43    IEM-PDMS(Mn ≈ 3000)-IPDI-PDMS(Mn ≈ 2000)-IPDI-PDMS(Mn ≈ 3000)-IEM
(see WO2016100457)

Mixtures of silicone-containing components may be used. By way of example, suitable mixtures may include, but are not limited to: a mixture of mono-(2-hydroxy-3-methacryloxypropyloxy)-propyl terminated mono-n-butyl terminated polydimethylsiloxane (OH-mPDMS) having different molecular weights, such as a mixture of OH-mPDMS containing 4 and 15 SiO repeat units; a mixture of OH-mPDMS with different molecular weights (e.g., containing 4 and 15 repeat SiO repeat units) together with a silicone based crosslinker, such as bis-3-acryloxy-2-hydroxypropyloxypropyl polydimethylsiloxane (ac-PDMS); a mixture of 2-hydroxy-3-[3-methyl-3,3-di(trimethylsiloxy)silylpropoxy]-propyl methacrylate (SiMAA) and mono-methacryloxypropyl terminated mono-n-butyl terminated polydimethylsiloxane (mPDMS), such as mPDMS 1000.

Silicone-containing components for use in the invention may have an average molecular weight of from about 400 to about 4000 Daltons.

The silicone containing component(s) may be present in amounts up to about 95 weight %, or from about 10 to about 80 weight %, or from about 20 to about 70 weight %, based upon all reactive components of the reactive mixture (excluding diluents).

Polyamides

The reactive mixture may include at least one polyamide. As used herein, the term "polyamide" refers to polymers and copolymers comprising repeating units containing amide groups. The polyamide may comprise cyclic amide groups, acyclic amide groups and combinations thereof and may be any polyamide known to those of skill in the art. Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae G1 and G2:

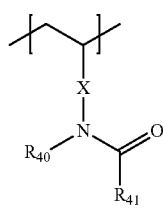

Formula G1

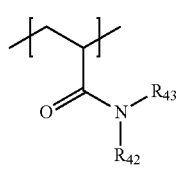

Formula G2 wherein X is a direct bond, —(CO)—, or —(CONHR$_{44}$)—, wherein R$_{44}$ is a C$_1$ to C$_3$ alkyl group; R$_{40}$ is selected from H, straight or branched, substituted or unsubstituted C$_1$ to C$_4$ alkyl groups; R$_{41}$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$_{42}$ is selected from H, straight or branched, substituted or unsubstituted C$_1$ to C$_4$ alkyl groups; or methyl, ethoxy, hydroxyethyl, and hydroxymethyl; R$_{43}$ is selected from H, straight or branched, substituted or unsubstituted C$_1$ to C$_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less; and wherein the number of carbon atoms in R$_{42}$ and R$_{43}$ taken together is 8 or less, including 7, 6, 5, 4, 3, or less.

The number of carbon atoms in R$_{40}$ and R$_{41}$ taken together may be 6 or less or 4 or less. The number of carbon atoms in R$_{42}$ and R$_{43}$ taken together may be 6 or less. As used herein substituted alkyl groups include alkyl groups substituted with an amine, amide, ether, hydroxyl, carbonyl or carboxy groups or combinations thereof.

R$_{40}$ and R$_{41}$ may be independently selected from H, substituted or unsubstituted C$_1$ to C$_2$ alkyl groups. X may be a direct bond, and R$_{40}$ and R$_{41}$ may be independently selected from H, substituted or unsubstituted C$_1$ to C$_2$ alkyl groups. R$_{42}$ and R$_{43}$ can be independently selected from H, substituted or unsubstituted C$_1$ to C$_2$ alkyl groups, methyl, ethoxy, hydroxyethyl, and hydroxymethyl.

The acyclic polyamides of the present invention may comprise a majority of the repeating units of Formula LV or Formula LVI, or the acyclic polyamides can comprise at least 50 mole percent of the repeating unit of Formula G or Formula G1, including at least 70 mole percent, and at least 80 mole percent. Specific examples of repeating units of Formula G and Formula G1 include repeating units derived from N-vinyl-N-methylacetamide, N-vinylacetamide, N-vinyl-N-methylpropionamide, N-vinyl-N-methyl-2-methylpropionamide, N-vinyl-2-methyl-propionamide, N-vinyl-N,N'-dimethylurea, N,N-dimethylacrylamide, methacrylamide, and acyclic amides of Formulae G2 and G3:

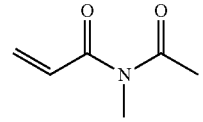

Formula G2

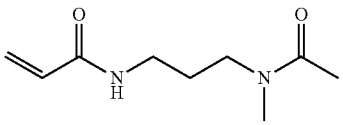

Formula G3

Examples of suitable cyclic amides that can be used to form the cyclic polyamides of include α-lactam, β-lactam, γ-lactam, δ-lactam, and ε-lactam. Examples of suitable cyclic amides include polymers and copolymers comprising repeating units of Formula G4:

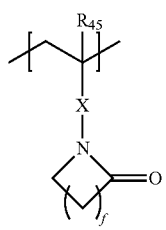

Formula G4 wherein $R_{45}$ is a hydrogen atom or methyl group; wherein f is a number from 1 to 10;
wherein X is a direct bond, —(CO)—, or —(CONHR$_{46}$)—, wherein $R_{46}$ is a $C_1$ to $C_3$ alkyl group.

In Formula LIX, f may be 8 or less, including 7, 6, 5, 4, 3, 2, or 1. In Formula G4, f may be 6 or less, including 5, 4, 3, 2, or 1. In Formula G4, f may be from 2 to 8, including 2, 3, 4, 5, 6, 7, or 8. In Formula LIX, f may be 2 or 3. When X is a direct bond, f may be 2. In such instances, the cyclic polyamide may be polyvinylpyrrolidone (PVP).

The cyclic polyamides of the present invention may comprise 50 mole percent or more of the repeating unit of Formula G4, or the cyclic polyamides can comprise at least 50 mole percent of the repeating unit of Formula G4, including at least 70 mole percent, and at least 80 mole percent.

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth)acrylates. Any of the monomers listed as suitable hydrophilic monomers may be used as co-monomers to form the additional repeating units. Specific examples of additional monomers which may be used to form polyamides include 2-hydroxyethyl (meth)acrylate, vinyl acetate, acrylonitrile, hydroxypropyl (meth)acrylate, methyl (meth)acrylate and hydroxybutyl (meth)acrylate, dihydroxypropyl (meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-β-alanine (VINAL, CAS #148969-96-4), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N, N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio) propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. The polyamide may be a mixture of PVP (e.g., PVP K90) and PVMA (e.g., having a M. of about 570 KDa).

The total amount of all polyamides in the reactive mixture may be in the range of between 1 weight percent and about 35 weight percent, including in the range of about 1 weight percent to about 15 weight percent, and in the range of about 5 weight percent to about 15 weight percent, in all cases, based on the total weight of the reactive components of the reactive monomer mixture.

Without intending to be bound by theory, when used with a silicone hydrogel, the polyamide functions as an internal wetting agent. The polyamides of the present invention may be non-polymerizable, and in this case, are incorporated into the silicone hydrogels as semi-interpenetrating networks. The polyamides are entrapped or physically retained within the silicone hydrogels. Alternatively, the polyamides of the present invention may be polymerizable, for example as polyamide macromers or prepolymers, and in this case, are covalently incorporated into the silicone hydrogels. Mixtures of polymerizable and non-polymerizable polyamides may also be used.

When the polyamides are incorporated into the reactive monomer mixture they may have a weight average molecular weight of at least 100,000 Daltons; greater than about 150,000; between about 150,000 to about 2,000,000 Daltons; between about 300,000 to about 1,800,000 Daltons. Higher molecular weight polyamides may be used if they are compatible with the reactive monomer mixture.

Cross-Linking Agents

It is generally desirable to add one or more cross-linking agents, also referred to as cross-linking monomers, multifunctional macromers, and prepolymers, to the reactive mixture. The cross-linking agents may be selected from bifunctional crosslinkers, trifunctional crosslinkers, tetrafunctional crosslinkers, and mixtures thereof, including silicone-containing and non-silicone containing cross-linking agents. Non-silicone-containing cross-linking agents include ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allylmethacrylate, methylene bisacrylamide (MBA), and polyethylene glycol dimethacrylate wherein the polyethylene glycol has a molecular weight up to about 5000 Daltons. The cross-linking agents are used in the usual amounts, e.g., from about 0.000415 to about 0.0156 mole per 100 grams of reactive Formulas in the reactive mixture. Alternatively, if the hydrophilic monomers and/or the silicone-containing components are multifunctional by molecular design or because of impurities, the addition of a cross-linking agent to the reactive mixture is optional. Examples of hydrophilic monomers and macromers which can act as the cross-linking agents and when present do not require the addition of an additional cross-linking agent to the reactive mixture include (meth)acrylate and (meth)acrylamide end capped polyethers. Other cross-linking agents will be known to one skilled in the art and may be used to make the silicone hydrogel of the present invention.

It may be desirable to select crosslinking agents with similar reactivity to one or more of the other reactive components in the formulation. In some cases, it may be desirable to select a mixture of crosslinking agents with different reactivity in order to control some physical, mechanical or biological property of the resulting silicone hydrogel. The structure and morphology of the silicone hydrogel may also be influenced by the diluent(s) and cure conditions used.

Multifunctional silicone-containing components, including macromers, cross-linking agents, and prepolymers, may also be included to further increase the modulus and retain tensile strength. The silicone containing cross-linking agents may be used alone or in combination with other cross-linking agents. An example of a silicone containing component which can act as a cross-linking agent and, when present, does not require the addition of a crosslinking monomer to the reactive mixture includes α, ω-bismethacryloxypropyl polydimethylsiloxane. Another example is bis-3-acryloxy-2-hydroxypropyloxypropyl polydimethylsiloxane (ac-PDMS).

Cross-linking agents that have rigid chemical structures and polymerizable groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)-phenyl]propane, and 4-vinylbenzyl methacrylate, and combinations thereof. Rigid crosslinking agents may be included in amounts between about 0.5 and about 15, or 2-10, 3-7 based upon the total weight of all of the reactive components. The physical and mechanical properties of the silicone hydrogels of the present invention may be optimized for a particular use by adjusting the components in the reactive mixture.

Non-limiting examples of silicone cross-linking agents also include the multi-functional silicone-containing components described above, such as compounds of Formula E (and its sub-formulae) and the multi-functional compounds shown in Table 3.

Further Constituents

The reactive mixture may contain additional components such as, but not limited to, diluents, initiators, UV absorbers, visible light absorbers, photochromic compounds, pharmaceuticals, nutraceuticals, antimicrobial substances, tints, pigments, copolymerizable dyes, nonpolymerizable dyes, release agents, and combinations thereof.

Classes of suitable diluents for silicone hydrogel reactive mixtures include alcohols having 2 to 20 carbon atoms, amides having 10 to 20 carbon atoms derived from primary amines and carboxylic acids having 8 to 20 carbon atoms. The diluents may be primary, secondary, and tertiary alcohols.

Generally, the reactive components are mixed in a diluent to form a reactive mixture. Suitable diluents are known in the art. For silicone hydrogels, suitable diluents are disclosed in WO 03/022321 and U.S. Pat. No. 6,020,445, the disclosure of which is incorporated herein by reference.

Classes of suitable diluents for silicone hydrogel reactive mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like. Examples of amide diluents include N,N-dimethyl propionamide and dimethyl acetamide.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

If a diluent is present, generally there are no particular restrictions with respect to the amount of diluent present. When diluent is used, the diluent may be present in an amount in the range of about 2 to about 70 weight percent, including in the range of about 5 to about 50 weight percent, and in the range of about 15 to about 40 weight percent, based on the total weight of the reactive mixtures (including reactive and nonreactive Formulas). Mixtures of diluents may be used.

A polymerization initiator may be used in the reactive mixture. The polymerization initiator may include, for instance, at least one of lauroyl peroxide, benzoyl peroxide, iso-propyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphine oxide (Irgacure 819), 2,4,6-trimethylbenzyldiphenyl phos-phine oxide and 2,4,6-trimethylbenzoyl diphenylphosphine oxide, benzoin methyl ester and a combination of cam-phorquinone and ethyl 4-(N,N-dimethylamino)benzoate.

Commercially available (from IGM Resins B.V., The Netherlands) visible light initiator systems include Irgacure® 819, Irgacure® 1700, Irgacure® 1800, Irgacure® 819, Irgacure® 1850 and Lucrin® TPO initiator. Commercially available (from IGM Resins B.V.) UV photoinitiators include Darocur® 1173 and Darocur® 2959. These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998. The initiator is used in the reactive mixture in effective amounts to initiate photopolymerization of the reactive mixture, e.g., from about 0.1 to about 2 parts by weight per 100 parts of reactive monomer mixture. Polymerization of the reactive mixture can be initiated using the appropriate choice of heat or visible or ultraviolet light or other means depending on the polymerization initiator used. Alternatively, initiation can be conducted using e-beam without a photoinitiator. However, when a photoinitiator is used, the preferred initiators are bisacylphosphine oxides, such as bis(2,4,6-tri-methylbenzoyl)-phenyl phosphine oxide (Irgacure® 819) or a combination of 1-hydroxycyclohexyl phenyl ketone and bis(2,6-dimethoxybenzoyl)-2,4-4-trimethylpentyl phosphine oxide (DMBAPO).

The reactive mixture for making the ophthalmic devices of the invention may comprise, in addition to a high energy visible light absorbing compound, any of the polymerizable compounds and optional components described above.

Preferred reactive mixtures may comprise: a high energy visible light absorbing compound, such as a formula I compound, and a hydrophilic component.

Preferred reactive mixtures may comprise: a high energy visible light absorbing compound, such as a formula I compound, and a hydrophilic component selected from DMA, NVP, HEMA, VMA, NVA, methacrylic acid, and mixtures thereof. Preferred are mixtures of HEMA and methacrylic acid.

Preferred reactive mixtures may comprise: a high energy visible light absorbing compound, such as a formula I compound, a hydrophilic component, and a silicone-containing component.

Preferred reactive mixtures may comprise: a high energy visible light absorbing compound, such as a formula I compound, a hydrophilic component, and a silicone-containing component comprising a compound of formula A.

Preferred reactive mixtures may comprise: a high energy visible light absorbing compound, such as a formula I compound, a hydrophilic component selected from DMA, NVP, HEMA, VMA, NVA, and mixtures thereof; a silicone-containing component such as a compound of formula A; and an internal wetting agent.

Preferred reactive mixtures may comprise: a high energy visible light absorbing compound, such as a formula I compound, a hydrophilic component selected from DMA, HEMA and mixtures thereof; a silicone-containing component selected from 2-hydroxy-3-[3-methyl-3,3-di(trimethylsiloxy)silylpropoxy]-propyl methacrylate (SiMAA), monomethacryloxypropyl terminated mono-n-butyl terminated polydimethylsiloxane (mPDMS), mono-(2-hydroxy-3-methacryloxypropyl)-propyl ether terminated mono-n-butyl terminated polydimethylsiloxane (OH-mPDMS), and mixtures thereof; and a wetting agent (preferably PVP or PVMA). For the hydrophilic component, mixtures of DMA and HEMA are preferred. For the silicone containing component, mixtures of SiMAA and mPDMS are preferred.

Preferred reactive mixtures may comprise: a high energy visible light absorbing compound, such as a formula I compound, a hydrophilic component comprising a mixture of DMA and HEMA; a silicone-containing component comprising a mixture of OH-mPDMS having from 2 to 20 repeat units (preferably a mixture of 4 and 15 repeat units). Preferably, the reactive mixture further comprises a silicone-containing crosslinker, such as ac-PDMS. Also preferably, the reactive mixture contains a wetting agent (preferably DMA, PVP, PVMA or mixtures thereof).

Preferred reactive mixtures may comprise: a high energy visible light absorbing compound, such as a formula I compound; between about 1 and about 15 wt % of at least one polyamide (e.g., an acyclic polyamide, a cyclic polyamide, or mixtures thereof); at least one first mono-functional, hydroxyl substituted poly(disubstituted siloxane) having 4 to 8 siloxane repeating units (e.g., OH-mPDMS where n is 4 to 8, preferably n is 4); at least one second hydroxyl substituted poly(disubstituted siloxane) that is a mono-functional hydroxyl substituted poly(disubstituted siloxane)s having 10 to 200 or 10-100 or 10-50 or 10-20 siloxane repeating units (e.g., OH-mPDMS where n is 10 to 200 or 10-100 or 10-50 or 10-20, preferably n is 15); about 5 to about 35 wt % of at least one hydrophilic monomer; and optionally a multifunctional hydroxyl substituted poly(disubstituted siloxane)s having 10 to 200, or 10 to 100 siloxane repeating units (e.g., ac-PDMS). Preferably, the first monofunctional, hydroxyl substituted poly(disubstituted siloxane) and the second hydroxyl substituted poly(disubstituted siloxane) are present in concentrations to provide a ratio of weight percent of the first mono-functional, hydroxyl substituted poly(disubstituted siloxane) to weight percent of the second hydroxyl substituted poly(disubstituted siloxane) of 0.4-1.3, or 0.4-1.0.

The foregoing reactive mixtures may contain optional ingredients such as, but not limited to, one or more initiators, internal wetting agents, crosslinkers, other UV or HEV absorbers, and diluents.

Curing of Hydrogels and Manufacture of Lens

The reactive mixtures may be formed by any of the methods known in the art, such as shaking or stirring, and used to form polymeric articles or devices by known methods. The reactive components are mixed together either with or without a diluent to form the reactive mixture.

For example, ophthalmic devices may be prepared by mixing reactive components, and, optionally, diluent(s), with a polymerization initiator and curing by appropriate conditions to form a product that can be subsequently formed into the appropriate shape by lathing, cutting, and the like. Alternatively, the reactive mixture may be placed in a mold and subsequently cured into the appropriate article.

A method of making a molded ophthalmic device, such as a silicone hydrogel contact lens, may comprise: preparing a reactive monomer mixture; transferring the reactive monomer mixture onto a first mold; placing a second mold on top the first mold filled with the reactive monomer mixture; and curing the reactive monomer mixture by free radical copolymerization to form the silicone hydrogel in the shape of a contact lens.

The reactive mixture may be cured via any known process for molding the reactive mixture in the production of contact lenses, including spin casting and static casting. Spin casting methods are disclosed in U.S. Pat. Nos. 3,408,429 and 3,660,545, and static casting methods are disclosed in U.S. Pat. Nos. 4,113,224 and 4,197,266. The contact lenses of this invention may be formed by the direct molding of the silicone hydrogels, which is economical, and enables precise control over the final shape of the hydrated lens. For this method, the reactive mixture is placed in a mold having the shape of the final desired silicone hydrogel and the reactive mixture is subjected to conditions whereby the monomers polymerize, thereby producing a polymer in the approximate shape of the final desired product.

After curing, the lens may be subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble Formulas such as inorganic salts or release agents, wetting agents, slip agents, pharmaceutical and nutraceutical Formulas, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may not require special handling, such as purification, recycling or special disposal procedures.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leaching or extraction aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

The lenses may be sterilized by known means such as, but not limited to, autoclaving.

As indicated above, preferred ophthalmic devices are contact lenses, more preferably soft hydrogel contact lenses. The transmission wavelengths and percentages described herein may be measured on various thicknesses of lenses using, for instance, the methodologies described in the Examples. By way of example, a preferred center thickness for measuring transmission spectra in a soft contact lens may be from 220 microns (hyperopic) to 70 microns (myopic), from 80 to 100 microns, from 90 to 100 microns, or from 90 to 95 microns. Typically, the measurement may be made at the center of the lens using, for instance, a 4 nm instrument slit width. Various concentrations of the one or more high energy visible light absorbing compounds may be used to achieve the transmission characteristics described above. For instance, the concentration may be in the range of at least 1 percent, or at least 2 percent; and up to 10 percent, or up to 5 percent, based on the weight percentages of all components in the reactive mixture, excluding diluent. A typical concentration may be in the range of 3 to 5 percent.

Silicone hydrogel ophthalmic devices (e.g., contact lenses) according to the invention preferably exhibit the following properties. All values are prefaced by "about," and the devices may have any combination of the listed properties. The properties may be determined by methods known to those skilled in the art, for instance as described in United States pre-grant publication US20180037690, which is incorporated herein by reference.

Water concentration %: at least 20%, or at least 25% and up to 80% or up to 70%

Haze: 30% or less, or 10% or less

Advancing dynamic contact angle (Wilhelmy plate method): 100° or less, or 80' or less; or 50° or less Tensile Modulus (psi): 150 or less, or 135 or less, 120 or less, or 80 to 135

Oxygen permeability (Dk, barrers): at least 60 barrers, or at least 80, or at least 100, or at least 150, or at least 200

Elongation to Break: at least 100

For ionic silicon hydrogels, the following properties may also be preferred (in addition to those recited above):

Lysozyme uptake (μg/lens): at least 100, or at least 150, or at least 500, or at least 700

Polyquaternium 1 (PQ1) uptake (%): 15 or less, or 10 or less, or 5 or less.

Some embodiments of the solution of this disclosure will now be described in detail in the following Examples.

Study Overview

The study of this disclosure included a multi-site, 5-visit, controlled, randomized, subject-masked, 2×2 crossover, 2-week dispensing each lens, bilateral wear feasibility study. A computer-generated randomization scheme was used to randomly assign subjects, in blocks of 2, to one of the two possible lens wear sequences (Test/Control or Control/Test). Study subjects were recruited from a site's subject database and/or utilizing Independent Ethics Committee (IEC) or Institutional Review Board (IRB) approved materials.

As representative overview of the study flow using the patients with the example lenses can be described as follows. Approximately 200 patients are selected wearing lenses having powers −1.00 to −6.00 in 0.25 D steps. Patients are habitual wearers of spherical silicone soft contact lenses worn as daily wear. Clinical prescription of patients is current within prior 6 months and worn for at least two weeks. Patients are at least 18 years of age and younger than 40 years of age. Patients complete informed consent and baseline information is collected through questionnaires including habitual lens type and modality, iris color, subjective refraction, and physiology. In a first trial period, subjects are randomly assigned, and fit, a Test or Control Lens on both eyes. Powers are modified to obtain a 000 D spherical over-refraction. A ten minute evaluation is performed to assess symptoms, appropriate fitting, 20/30 or better vision in both eyes, and other investigator approval criteria. A first follow-up is completed within six to eight days, and second through fifth follow-ups are each completed within six to eight days following the previous follow-up. The subjects enter each of the second through fifth follow-ups are wearing their study contact lenses. For each of the follow-ups, compliance to the study, patient reported outcomes, lens preference, visual acuity and physiology, and surface characteristics are assessed.

The primary objective of the study was to evaluate the clinical performance of the investigational contact lens (hereafter "Test lens") compared to the contact lens (hereafter "Control lens") with respect to subjective vision across both the 1-week and 2-week follow-up. The Control lens as referenced herein can be understood as a contact lens that transmits at least 90 percent of light across the wavelength range of 400 to 409 nm. The Control lens is described in U.S. Pat. Nos. 6,822,016; 7,461,937; 9,439,487; and 10,254,443 the disclosures of each of which are incorporated herein in their entireties. The Test lens is essentially identical to the Control lens but for addition of HEV light absorbing compound.

The secondary objectives were to evaluate the clinical performance of the Test lens compared to the Control lens with respect to subjective comfort and handling, across both the 1-week and 2-week and at each 1-week and 2-week follow-up evaluation. Subjective vision at each 1-week and 2-week follow-up were also assessed.

Other objectives of the study include evaluating the performance of the Test lens compared to the Control lens with respect to driving performance, indoor performance, outdoor performance, and digital performance across both the 1-week and 2-week and at each 1-week and 2-week follow-up evaluation. Study lens preference to habitual lens was collected at the 1- and 2-week follow-up during Period 1. Preference of Control to Test lens was collected at the 1- and 2-week follow-up during Period 2.

The overall goal was to enroll approximately 200 eligible subjects and complete 170 that were evenly distributed between those that begin with the Test lens and those that begin with the Control lens, as summarized in FIG. 1. FIGS. 2-3 shows a table summarizing timing and events schedule in the study. A final evaluation took place immediately following the last scheduled follow-up visit (fifth follow-up visit) per the study protocol. It may also have taken place at any point the subject discontinued the study or was terminated from the study. If, during the investigation, a subject required an unscheduled visit to the clinical site, the following information was collected at a minimum: Chief complaint prompting the visit; date and time of the visit and all procedures completed at the unscheduled visit; review of adverse event and concomitant medications; documentation of any test article dispensed or collected from the subject, if applicable; and slit lamp findings (using the Slit Lamp Classification Scale).

If the Investigator withdrew a subject from the study, the final study visit case report forms were completed indicating the reason(s) why the subject was withdrawn. The subject record was completed documenting the date and primary reason for. Any ocular and non-ocular Adverse Events that were ongoing at the time of the study visit were followed by the Investigator, within licensure, until they were resolved, returned to pretreatment status, stabilized, or been satisfactorily explained. If further treatment i.e., beyond licensure was required, the subject was referred to the appropriate health care provider.

Information collected during unscheduled visits in the study of this disclosure relate to medications. Certain systemic medications such as estrogens (non-contraceptive), antihistamines (unless demonstrating successful wear of lenses while taking medication or if stopped taking medication at least two weeks prior to enrollment), anticholinergics, beta-blockers, psychotropics, and vitamin A analogs are known to have a higher likelihood to interfere with contact lens wear, chiefly by disrupting the tear film. Subjects taking these medications on a continual, routine basis that have demonstrated successful contact lens wear for at least 6 months were generally allowed to participate in this study. The investigator used their best clinical judgement for subjects taking these medications on a routine basis but for less than 6 months. If the professional opinion of the investigator indicates that these medications might interfere with any endpoint of this study, then the subject was not be allowed to enroll.

Habitual wearers of daily disposable lenses were preferentially targeted in a 7:3 ratio over habitual wearers of daily wear reusable lenses within each site (e.g., 7 habitual wearers of daily disposable lenses versus 3 habitual wearers of daily wear reusable lenses). The study began with an initial visit (Visit 1—Day 0). If a subject was found to meet all eligibility criteria, then they were randomized and fit with either the Control or Test, in both eyes; otherwise a subject was deemed ineligible for this study. If the subject was dispensed study lenses at the initial visit, 2 follow-up visits were conducted for that lens.

The follow-up visits occurred approximately at 1- and 2-weeks after the initial dispensing visit. Afterwards, this will be repeated for the alternate study lens. Unscheduled visits could occur during the study. Subjects were advised to wear the study for at least five (5) days per week for at least six (6) hours per day. Lenses were scheduled to be replaced daily. All unworn study lenses will be collected at the end of the study.

It is understood that the investigator in the study also evaluated adverse events to ensure the events were categorized correctly. Elements of categorization included seriousness/classifications, Causality or Relatedness—i.e. the relationship between the test article, study treatment or study procedures and the adverse event (e.g., not related; unlikely related; possibly related), Averse Event Severity which is used to assess the degree of intensity of the adverse event (e.g., mild; moderate; severe for all events); Outcome (e.g., recovered or not resolved; recovering or resolving; recovered or resolved with sequelae; recovered or resolved; death related to adverse event; unknown); and Actions Taken (e.g., none; temporarily discontinued; permanently discontinued; other).

Causality was also assessed in the study, which was understood as a determination of the relationship between an adverse event and the test article. The test article relationship for each adverse event was determined by the investigator using the following explanations: (1) Not Related—An adverse event that is not related to the use of the test article, study treatment or study procedures; (2) Unlikely Related—An adverse event for which an alternative explanation is more likely, e.g. concomitant treatment, concomitant disease(s), or the relationship of time suggests that a causal relationship is not likely; (3) Possibly Related—An adverse event that might be due to the use of the test article, or to the study treatment or study procedures. An alternative explanation (e.g. concomitant treatment, concomitant disease(s)) was deemed inconclusive with respect to causality. The relationship in time is reasonable. Therefore, the causal relationship cannot be excluded; and (4) Related—An adverse event that was listed as a possible adverse effect (device) or adverse reaction (drug) and cannot be reasonably explained by an alternative explanation, e.g. concomitant treatment of concomitant disease(s). The relationship in time is very suggestive, e.g. it is confirmed by de-challenge and re-challenge.

Severity was also assessed in the study, which was understood as a qualitative assessment of the degree of intensity of an adverse event as determined by the Investigator or reported to him/her by the subject. The assessment of severity was made irrespective of test article, study treatment or study procedure relationship or seriousness of the event and should be evaluated according to the following scale: (1) Mild—Event was noticeable to the subject, but was easily tolerated and did not interfere with the subject's daily activities; (2) Moderate—Event was bothersome, possible requiring additional therapy, and may interfere with the subject's daily activities; and (3) Severe—Event was intolerable, necessitates additional therapy or alteration of therapy and interferes with the subject's daily activities.

Primary endpoints of the study included overall quality of vision scores using Contact Lens User Experience (CLUE) questionnaire across the one and two-week follow-up evaluations. CLUE is a validated patient-reported outcomes questionnaire to assess patient-experience attributes of soft, disposable contact lenses (comfort, vision, handling, and packaging) in a contact-lens wearing population in the US, ages 18-65. Scores follow a normal distribution with a population average score of 60 (SD 20) and score range of 0 to 120, where higher scores indicate a more favorable/positive response. A 5-point increase in an average CLUE score translates into 10% shift in the distribution of scores for population of soft disposable contact lens wearers.

The secondary endpoints of the study included overall comfort and handling scores measured via the CLUE questionnaire across both the 1- and 2-week follow evaluations and at each of the 1- and 2-week follow-up evaluations, and overall quality of vision scores measured via the CLUE questionnaire at each of the 1- and 2-week follow-up evaluations.

The following items were also assessed with patient reported outcome (PRO) questions across both the 1- and 2-week follow-up evaluations and at each 1- and 2-week follow-up evaluation:
1. Driving Performance as follows:
    My vision was clear enough to allow me to drive at night
    Ability to see comfortably while driving at night
    With these lenses, I felt very confident to drive at night
2. Digital Performance as follows:
    Overall preference while using computer screens and digital devices
3. Comfort Performance as follows:
    Overall preference for comfort at the end of the day
    These lenses were comfortable at the end of the day
    Comfort at the end of the day
4. CLUE scores:
    CLUE comfort score
    CLUE vision score Most individual items described above for driving and digital performance were all assessed using the same response set of (1: Excellent, 2: Very Good, 3: Good, 4: Fair and 5: Poor). A different 5-point scale was used where more appropriate. Preference between study lenses was also asked at Visit 4 and Visit 5 according to the same preference questions as above, as well as acceptable fit rates and surface characteristics.

CLUE vision scores were analyzed using a linear mixed model to compare the Test and Control lenses across both the 1- and 2-week follow-up evaluations. The analysis was conducted on the Intent-to-Treat (ITT) population. The final model included baseline CLUE vision scores, lens type, lens sequence, period, timepoint (1- and 2-week follow-up), and the interaction between lens type and timepoint as fixed effects. Other subject characteristics such as age, gender, iris category, and subject group based on habitual lens wear (habitual daily disposable and habitual daily wear reusable) were included as fixed covariates. Site and subject were random effects (G-side). Residuals within the same subject and period across different time points (R-side) were modeled using Unstructured (UN) covariance structure. The Kenward and Roger method (Kenward & Roger, 1997)18 was used for the denominator degree of freedom.

The null and alternative hypotheses for testing superiority of the Test lens relative to the Control lens with respect to CLUE vision scores were as follows:

$$H_0: \mu_T - \mu_C \leq 0$$

$$H_A: \mu_T - \mu_C > 0$$

$\mu_T$ represents the average CLUE vision score across the 1- and 2-week follow-up for the Test lens and $\mu_C$ represents the average CLUE vision score for the Control lens. Superiority was declared if the lower bound of the 2-sided 95% confidence interval of the difference (Test—Control) was greater than 0.

CLUE overall comfort score was analyzed in the per-protocol population using the same model as described for the primary analysis of CLUE vision. The null and alternative hypotheses for testing non-inferiority of the Test relative to the Control across both the 1-week and 2-week follow-up evaluations with respect to CLUE comfort or handling score were as follows:

$$H_0: \mu_T - \mu_C \leq -5$$

$$H_A: \mu_T - \mu_C > -5$$

$\mu_T$ represents the average CLUE comfort score across both the 1- and 2-week follow-up for the Test and $\mu_C$ represents the average CLUE comfort score for the Control lens across both the 1- and 2-week follow-up. Non-inferiority was declared if the lower bound of the 2-sided 95% confidence interval of the difference between the Test lens and the Control lens is greater than −5. In addition to the hypothesis testing for each CLUE domain (Comfort and Vision) across both the 1- and 2-week follow-ups, comparisons were also made at each follow-up evaluation for each CLUE domain in the same models presented above.

All driving and digital performance items were assessed using ordinal scales. Item responses were reversely coded for analysis if needed so that the higher score always indicate the more positive/favorable ratings. Responses to the driving performance and digital performance items were collapsed to binary categories (1=the top two best responses and 0=others) and analyzed separately using a generalized linear mixed model with a binomial distribution and the logit as the link function. Each model included lens type, sequence, period, timepoint (1- and 2-Week), and the interaction of lens type by timepoint as fixed effects. Age, gender, subject group based on habitual lens wear, and iris category were included as fixed covariates. Site and subject were random effects. The UN covariance structure was used to model the covariance of residual errors between timepoints across periods within the same subject. Analyses for items were conducted on the Intent-to-Treat (ITT) population.

The null and alternative hypotheses for testing superiority with respects to driving and digital performance items in the ITT population were as follows:

$$H_0: OR \leq 0$$

$$H_A: OR > 0$$

Where OR represents the odds ratio of having more positive/favorable ratings (i.e., the top two best response categories, T2B) for the Test lens compared to the Control across both the 1- and 2-week follow-up for each individual item. For each individual item, superiority was declared if the lower bound of the 2-sided 95% confidence interval constructed for odds ratio was above 1.0.

Patient Selection for the Study

Inclusion criteria for the study included the following:
1. The subject must read, understand, and sign the STATEMENT OF INFORMED CONSENT and receive a fully executed copy of the form.
2. The subject must appear able and willing to adhere to the instructions set forth in this clinical protocol.
3. The subject must be ≥18 and <40 years of age.
4. The subject must be an adapted wearer of spherical silicone hydrogel soft contact lenses in both eyes. That is, the subject must wear their habitual lenses at least five (5) days per week and six (6) hours per day worn for at least 30 days immediately preceding the study.
5. The subject's habitual contact lens prescription must be current within the prior
6 months, and they must have worn that prescription for at least 2 weeks prior to entering the study.

Inclusion Criteria after Baseline
1. The subject's vertex corrected spherical equivalent distance refraction must be in the range of −1.00 through −6.00 D in both eyes.
2. The subject's refractive cylinder must be 1.00 D or less.
3. The subject must have best corrected visual acuity of 20/25 or better in each eye.

Exclusion criteria for the study after screening included the following:
1. Currently pregnant or breastfeeding (subjects who become pregnant during the study was discontinued).
2. Any ocular or systemic allergies or diseases that may interfere with contact lens wear.
3. Any autoimmune disease or use of medication, which may interfere with contact lens wear. Habitual medications used by successful soft contact lens wearers are considered acceptable.
4. Any previous, or planned, ocular or interocular surgery (e.g., radial keratotomy, PRK, LASIK, etc.).
5. Monovision, multi-focal, toric, or extended wear contact lens correction.
6. Participation in any contact lens or lens care product clinical trial within 14 days prior to study enrollment.
7. Employee or immediate family member of an employee of clinical site (e.g., Investigator, Coordinator, Technician)
8. History of binocular vision abnormality or strabismus.
9. Any infectious disease (e.g., hepatitis, tuberculosis) or contagious immunosuppressive diseases (e.g., HIV) by self-report.

Exclusion Criteria after Baseline included:
1. Any Grade 3 or greater slit lamp findings (e.g., edema, corneal neovascularization, corneal staining, tarsal abnormalities, conjunctival injection) on the FDA classification scale, any previous history or signs of a contact lens-related corneal inflammatory event (e.g., past peripheral ulcer or round peripheral scar), or any other ocular abnormality that may contraindicate contact lens wear.
2. Any ocular infection.
3. Any corneal distortion resulting from previous hard or rigid gas permeable contact lens wear.
4. Entropion, ectropion, extrusions, chalazia, recurrent styes, glaucoma, history of recurrent corneal erosions, or aphakia.

A subject was withdrawn from the study for any of the following reasons:
Subject death during the study period;
Subject withdrawal of consent;
Subject not compliant to protocol;
Subject lost to follow-up;
Subject no longer meets eligibility criteria (e.g. the subject becomes pregnant);
Subject develops significant or serious adverse events;
Subjects who have experienced a Corneal Infiltrative Event (CIE);
Investigator's clinical judgment regarding the subject safety reasons (that it is in the best interest of the subject to stop treatment);
Subject missed a scheduled study visit for which a primary or secondary end-point was being collected;
Subject not compliant with study lens wear schedule; and
Subject not successfully dispensed due to lack of efficacy and safety including poor vision, poor comfort or unacceptable fit Results of the Study In the study, data summaries and statistical analyses were performed using the Statistical Analysis System (SAS) software Version 9.4 (SAS Institute, Cary, NC). Throughout the analysis of data, the results for each subject/eye were used when available for summarization and statistical analysis. The sample size for this pilot study was not based on any empirical sample size calculation. Power was calculated for testing superiority with respect to CLUE vision scores based on the assumptions for intra-class correlation (ICC), overall variance, and true mean difference between the Test and Control lenses. With 170 subjects to complete the study, the statistical power for testing superiority of the Test lens with respects to CLUE vision scores would be about 88% assuming the true mean difference of 5 points and the common standard deviation of 22.

A total of 193 subjects were enrolled from 10 clinical sites (located in United States) in this study. Of those enrolled, a total of 191 subjects were randomly assigned among 2 unique lens sequences and included in the Intent-to-Treat population; while, two subjects were screen failures and/or not assigned. Of the total assigned subjects, 181 subjects completed the study while, 10 subjects were discontinued from the study. Three subjects were excluded from the analysis hence, the Per-Protocol Population included 178 subjects.

FIG. 4 shows a graph summarizing preferences as to overall preference of subjects in the study using computer screens and digital devices. With respect to overall preference while using computer screens and digital devices, at 1 week approximately 43.8% of subjects preferred the Test lens versus approximately 24.7% of subjects preferring the Control lens with the remaining 31.5% having no preference. In other words, the Test lens exhibited approximately 77.3% improvement over the performance of the Control lens with respect to overall preference while using computer screens and digital devices at 1-week. Similarly, at 2-weeks with respect to overall preference while using computer screens and digital devices, 44.9% of subjects preferred the Test lens for overall comfort versus approximately 21.9% of subjects preferring the Control lens with the remaining 33.1% having no preference. In other words, the Test lens exhibited approximately 105% improvement over the performance of the Control lens with respect to overall preference while using computer screens and digital devices at 2-weeks.

Figure 5:
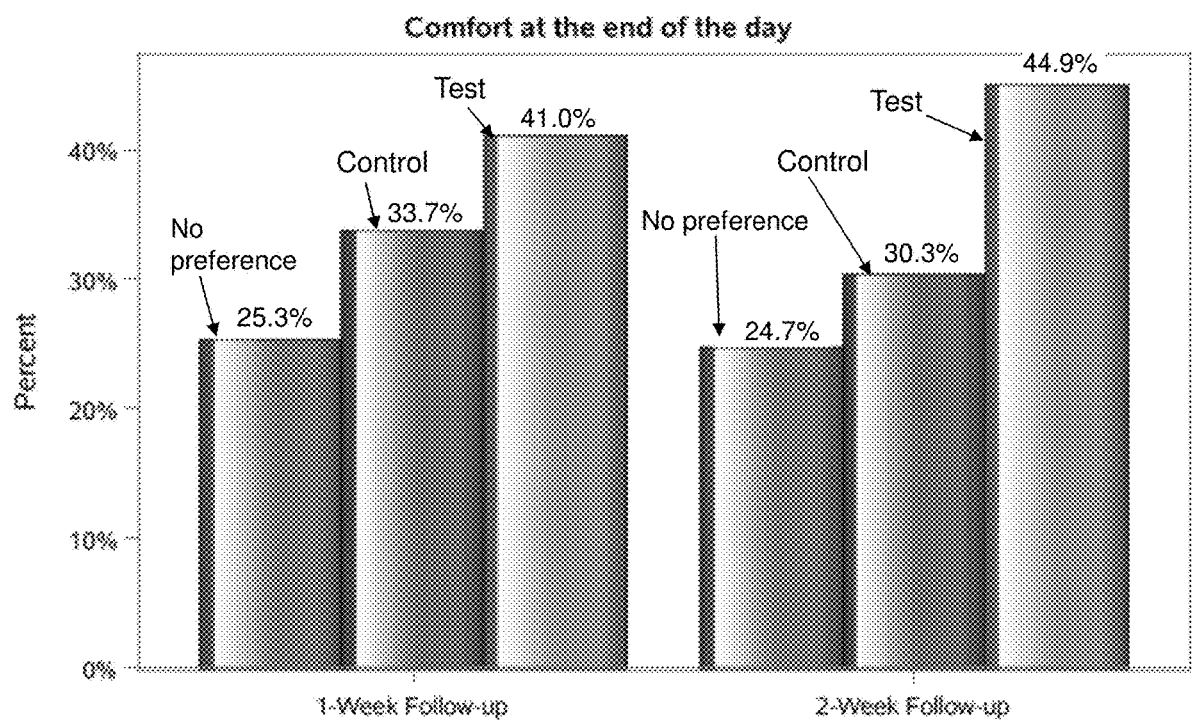
FIG. 5 shows a graph summarizing preferences as to comfort at the end of the day for subjects in the study.

FIG. 5 shows a graph summarizing preferences as to comfort at the end of the day. As shown, at 1 week approximately 41% of subjects preferred the Test lens versus approximately 33.7% of subjects preferring the Control lens with the remaining 25.3% having no preference. In other words, the Test lens exhibited approximately 21.7% improvement over the performance of the Control lens with respect to comfort at the end of the day at 1-week. Similarly, at 2-weeks with respect to comfort at the end of the day, 44.9% of subjects preferred the Test lens for overall comfort versus approximately 30.3% of subjects preferring the Control lens with the remaining 24.7% having no preference. In other words, the Test lens exhibited approximately 48.2% improvement over the performance of the Control lens with respect to comfort at the end of the day at 2-weeks.

Figure 6:
FIG. 6 shows a graph summarizing least squares mean difference of CLUE Vision scores (Test—Control) for subjects in the study.

FIG. 6 shows a graph summarizing as to least square (LS) mean differences between Test and Control and the corresponding 95% confidence intervals for CLUE Vision scores for subjects in the study. As can be seen, at 1 week, wearers of the Test lens were observed with an adjusted mean CLUE Vision score of approximately 70.3 while wearers of the Control lens were observed with an adjusted mean CLUE Vision Score of approximately 68.2; the LS mean difference (Test—Control) was 2.1 with the 95% confidence interval (CI) of (−0.5, 4.7). Similarly, at 2 weeks, wearers of the Test lens were observed with an adjusted mean CLUE Vision score of approximately 70.5 while wearers of the Control lens were observed with an adjusted mean CLUE Vision Score of approximately 67.3; the LS mean difference (Test—Control) was 3.3 with the 95% CI (0.8, 5.7). Overall, in the study, wearers of the Test lens were observed with an adjusted mean CLUE Vision score of approximately 70.4 while wearers of the Control lens were observed with an adjusted mean CLUE Vision Score of approximately 67.8; the LS mean difference (Test—Control) was 2.7 with the 95% CI (0.4, 4.9). Superiority of Test relative to Control with respects to CLUE Vision was met at 2-week follow-up and overall at the individual 0.05 significance level.

Figure 7:
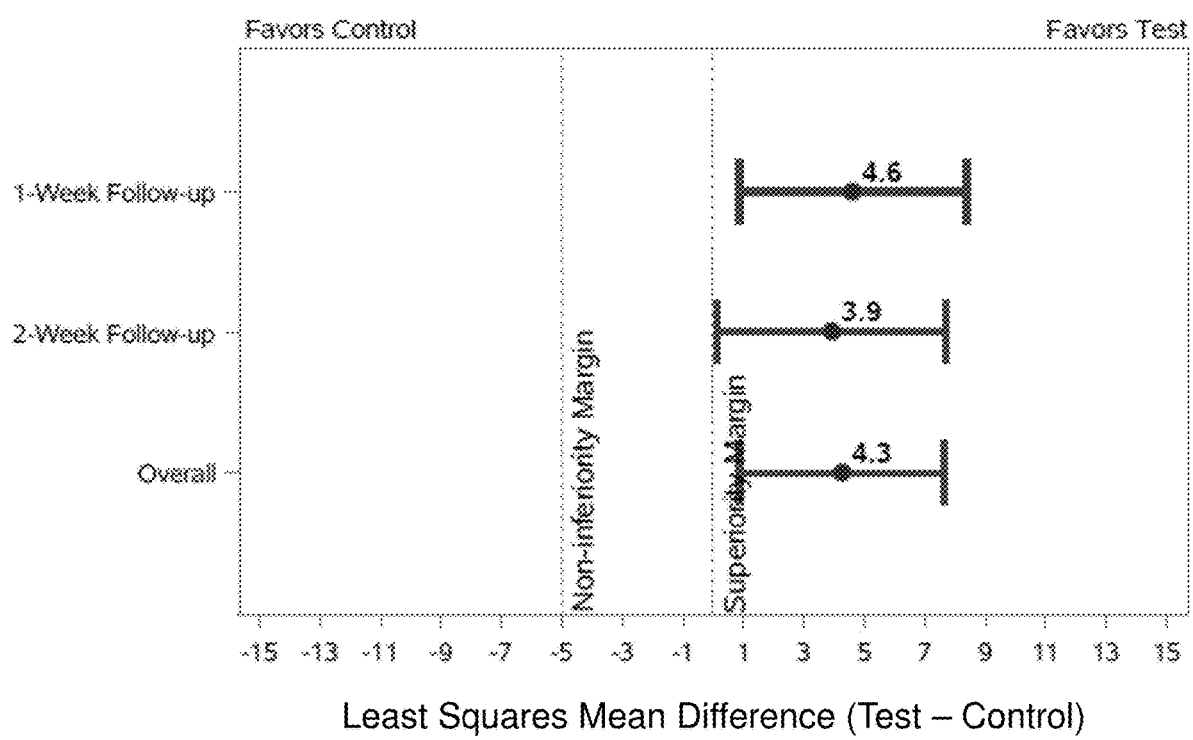
FIG. 7 shows a graph summarizing least squares mean difference of CLUE Comfort scores (Test—Control) for subjects in the study.

FIG. 7 shows a graph summarizing as to least square mean differences between Test and Control and the corresponding 95% confidence intervals for CLUE Comfort scores for subjects in the study. As can be seen, at 1 week, wearers of the Test lens were observed with an adjusted mean of approximately 72.2 for CLUE Comfort score while wearers of the Control lens were observed with an adjusted mean CLUE Comfort Score of approximately 67.6; the LS mean difference (Test—Control) was 4.6 with the 95% CI (0.8, 8.4). Similarly, at 2 weeks, wearers of the Test lens were observed with an adjusted mean of approximately 70.5 for CLUE Comfort score while wearers of the Control lens were observed with an adjusted mean CLUE Comfort Score of approximately 66.6; the LS mean difference (Test–Control) was 3.9 with the 95% CI (0.1, 7.7). Overall, in the study, wearers of the Test lens were observed with an adjusted mean of approximately 71.4 for CLUE Comfort score while wearers of the Control lens were observed with an adjusted mean CLUE Comfort Score of approximately 67.1; the LS mean difference (Test—Control) was 4.3 with the 95% CI (0.9, 7.6). Non-inferiority of Test relative to Control with respects to CLUE Comfort was met at each follow-up visit and overall across the two follow-up visits at the individual 0.05 significance level. Furthermore, statistical superiority of Test relative to Control was also met.

Figure 8:
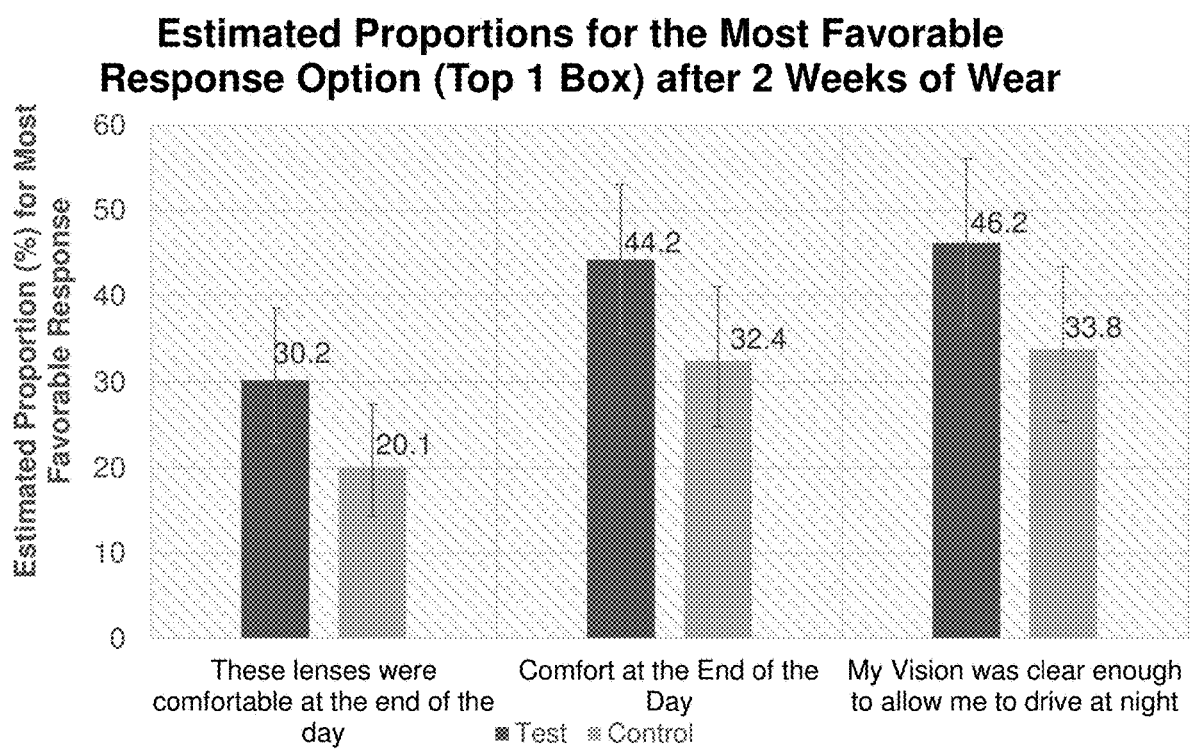
FIG. 8 shows a graph summarizing estimated top 1 box (T1B) proportion (%) at two-week follow-up for both the Control lens and the Test lens as compared to (a) these lenses were comfortable at the end of the day, (b) comfort at the end of the day, and (c) vision being clear enough to allow driving at night.

FIG. 8 shows a graph summarizing estimated top 1 box (T1B) proportion (%) at two-week follow-up for both the Control lens and the Test lens as compared to (a) these lenses were comfortable at the end of the day, (b) comfort at the end of the day, and (c) my vision was clear enough to allow me to drive at night. Approximately 30.2% of subjects (95% CI: 23.0%, 38.6%) rated T1B for the Test lens, approximately 20.1% of subjects (95% CI: 14.3%, 27.4%) rated T1B for the Control lens, and the Test lens was 1.73 times (95% CI for odds ratio: 1.11, 2.68) more likely to be rated in T1B than the Control lens, thereby indicating a statically significant preference for the Test lens compared to the Control with respect to "These lenses were comfortable at the end of the day". Approximately 44.2% of subjects (95% CI: 35.6%, 53.1%) rated T1B for the Test lens, approximately 32.4% of subjects (95% CI: 24.8%, 41.1%) rated T1B for the Control lens, and the Test lens was 1.65 times (95% CI for odds ratio: 1.09, 2.49) more likely to be rated in T1B than the Control lens, thereby indicating a statically significant preference for the Test lens compared to the Control with respect to "Comfort at the end of the day". Approximately 46.2% of subjects (95% CI: 36.6%, 56.1%) rated T1B for the Test lens, approximately 33.8% of subjects (95% CI: 25.4%, 43.4%) rated T1B for the Control lens, and the Test lens was 1.68 times (95% CI for odds ratio: 1.24, 2.28) more likely to be rated in T1B than the Control lens, thereby indicating a statically significant preference for the Test lens compared to the Control with respect to "My vision was clear enough to allow me to drive at night".

The terms "Top 1 Box" or "T1B" and "Top 2 Box" or "T2B" are referred to through this disclosure as a way of summarizing positive responses from a "Likert scale survey question". The term "T1B" includes the single most favorable response option (the remaining response options are collapsed to create another category). The term "T2B" includes the top two most favorable response options (the remaining response options are collapsed to create another category).

Figure 9:
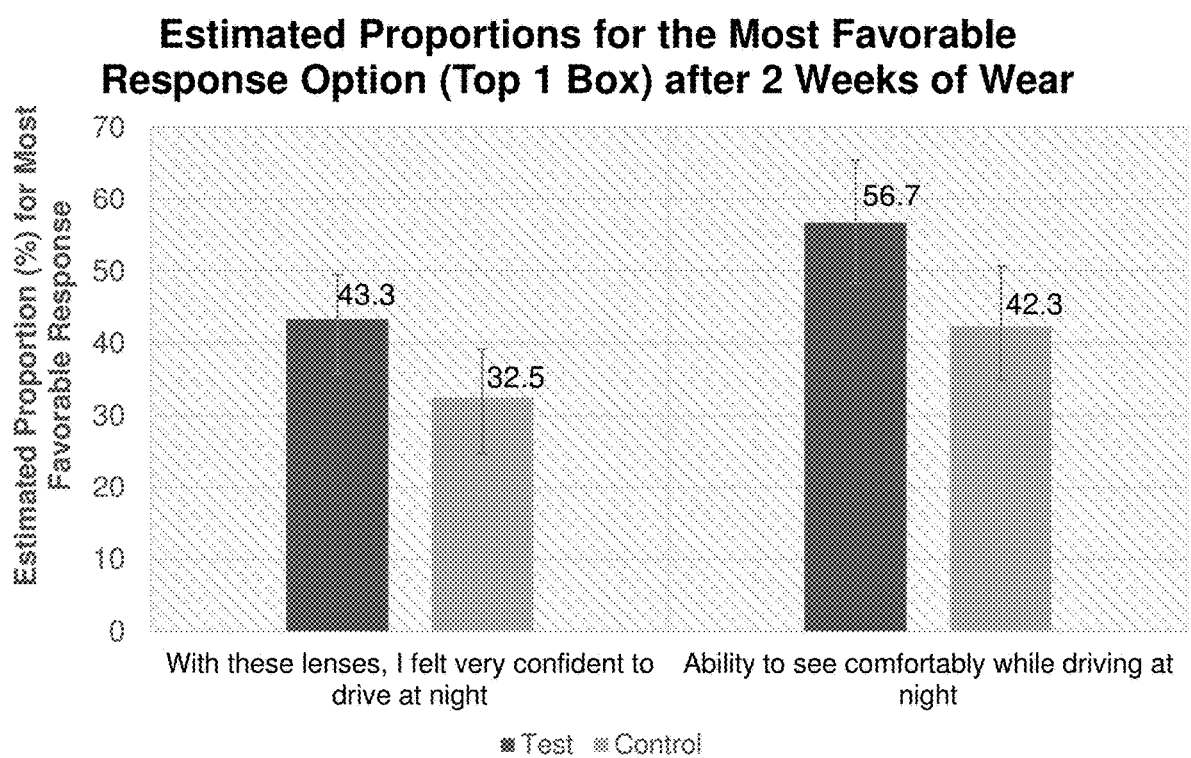
FIG. 9 shows a graph summarizing estimated top 1 box (T1B) proportion (%) at two-week follow-up for both the Control lens and the Test lens as compared to (a) with these lenses, I felt very confident to drive at night, and (b) ability to see comfortably while driving at night.

FIG. 9 shows a graph summarizing estimated top 1 box (T1B) proportion (%) at two-week follow-up for both the Control lens and the Test lens as compared to (a) with these lenses, I felt very confident to drive at night, and (b) ability to see comfortably while driving at night. Approximately 43.3% of subjects (95% CI: 34.9%, 52.1%) rated T1B for the Test lens and strongly agreed "with these lenses, I felt confidence to drive at night". Approximately 57% of subject (95% CI: 47.2%, 65.7%) rated T1B for the Test lens and on "ability to see comfortably while driving at night".

Figure 10:
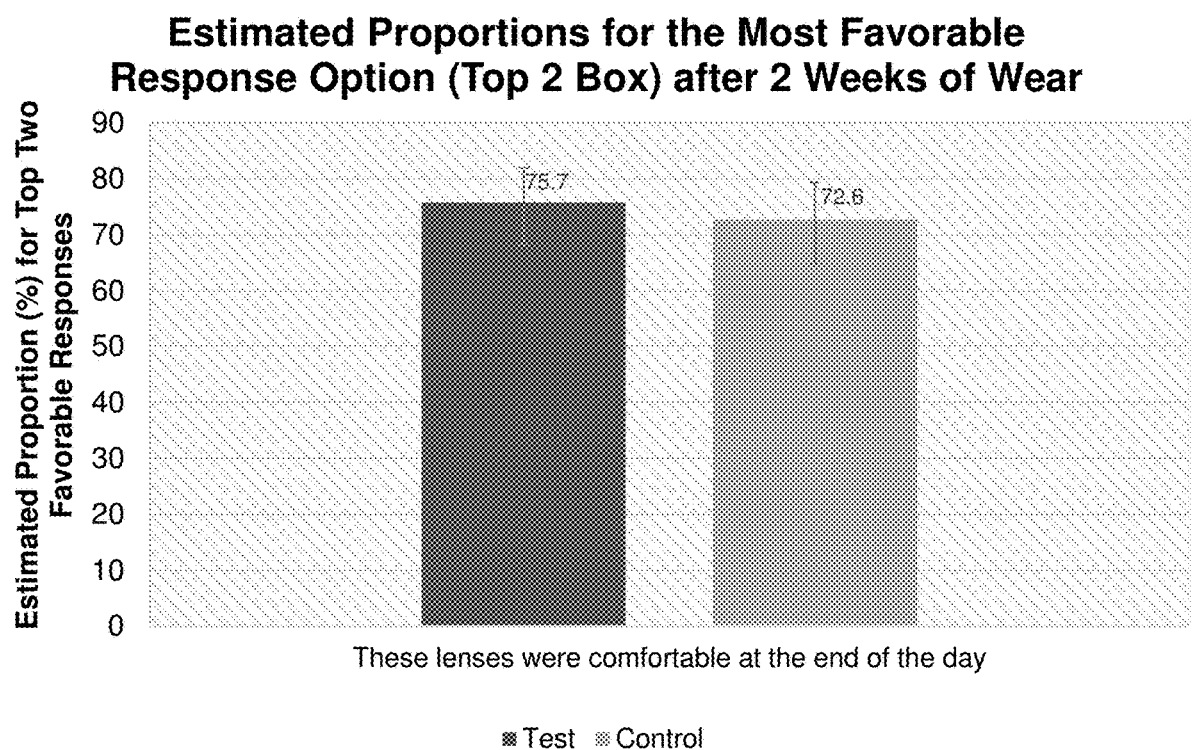
FIG. 10 shows a graph summarizing estimated T2B proportion (%) at two-week follow-up for both the Control lens and the Test lens as compared to (a) these lenses were comfortable at the end of the day.

FIG. 10 shows a shows a graph summarizing estimated T2B proportion (%) at two-week follow-up for both the Control lens and the Test lens as compared to (a) these lenses were comfortable at the end of the day. Approximately 75.7% of subjects (95% CI: 68.2%, 81.9%) strongly agreed or agreed (i.e., top 2 box proportion) that "the contact lens was comfortable at the end of the day".

FIG. 11 depicts a method or use 6000 of a contact lens. The method 6000 can include 6010 applying to at least one eye of a subject, a contact lens that is a free radical reaction product of a reactive mixture including one or more polymerizable compounds suitable for making the contact lens; and a high energy visible (HEV) light absorbing compound. The method 6000 can also include 6020 improving, by the contact lens, at least one clinical attribute comprising overall comfort, overall vision, overall preference of the contact lens while using computer screens and digital devices as observed by the subject, comfort at the end of the day, CLUE Comfort score, CLUE Vision score.

FIG. 12 depicts a method or use 6100 of a contact lens. The method 6100 can include 6110 applying to at least one eye of a subject, a contact lens that is a free radical reaction product of a reactive mixture including one or more polymerizable compounds suitable for making the contact lens; and a high energy visible (HEV) light absorbing compound. The method 6100 can also include 6120 improving, by the contact lens, comfort at the end of the day when compared to a second contact lens that transmits at least 90 percent of light across the wavelength range of 400 to 409 nm.

FIG. 13 depicts a method or use 6200 of a contact lens. The method 6200 can include 6210 applying to at least one eye of a subject a contact lens that is a free radical reaction product of a reactive mixture including one or more polymerizable compounds suitable for making the contact lens; and a high energy visible (HEV) light absorbing compound. The method 6200 can also include 6220 improving, by the contact lens, clarity of vision while driving at night when compared to a second contact lens that transmits at least 90 percent of light across the wavelength range of 400 to 409 nm.

FIG. 14 depicts a method or use 6300 of a contact lens. The method 6300 can include 6310 applying to at least one eye of a subject, a contact lens that is a free radical reaction product of a reactive mixture including one or more polymerizable compounds suitable for making the contact lens; and a high energy visible (HEV) light absorbing compound. The method 6300 can also include 6320 improving, by the contact lens, overall preference of the contact lens while using computer screens and digital devices as observed by the subject when compared to a second contact lens that transmits at least 90 percent of light across the wavelength range of 400 to 409 nm.

The test lens and related methods of use of this disclosure demonstrated clinically effective rates of improvement to one or more clinical attributes in a contact lens wearer of lenses of this disclosure. The specific configurations, choice of materials and the size and shape of various elements can be varied according to particular design specifications or constraints requiring a system or method constructed according to the principles of the disclosed technology. Such changes are intended to be embraced within the scope of the disclosed technology. The presently disclosed embodiments, therefore, are considered in all respects to be illustrative and not restrictive. It will therefore be apparent from the foregoing that while particular forms of the disclosure have been illustrated and described, various modifications can be made without departing from the spirit and scope of the disclosure and all changes that come within the meaning and range of equivalents thereof are intended to be embraced therein.

The following clauses list non-limiting embodiments of the disclosure.

1. A method or use of a contact lens, including:
   applying, to at least one eye of a contact lens wearer, the contact lens that is a free radical reaction product of a reactive mixture including one or more polymerizable compounds suitable for making the contact lens and a high energy visible (HEV) light absorbing compound; and
   improving, by the contact lens, when compared to a Control lens that transmits at least 90 percent of light across the wavelength range of 400 to 409 nm, at least one clinical attribute including overall comfort, overall vision, overall preference of the contact lens while using computer screens and digital devices as observed by the contact lens wearer, comfort at the end of the day, CLUE Comfort score, CLUE Vision score.
2. The method or use according to Clause 1, further including:
   transmitting, by the contact lens, from approximately 0 percent to 70 percent of light across a wavelength range of 400 to 409 nm.
3. The method or use according to Clause 1, further including:
   transmitting, by the contact lens, approximately 45 percent or less of light across a wavelength range of 280 to 399 nm.
4. The method or use according to Clause 1, further including:
   transmitting, by the contact lens, approximately at least 80 percent of light across a wavelength range of 450 to 800 nm.
5. The method or use according to Clause 1, wherein the contact lens is photostable.
6. The method or use according to Clause 1, wherein the high energy visible light absorbing compound is a static compound.
7. The method or use according to Clause 1, wherein the high energy visible light absorbing compound includes a compound of formula I:

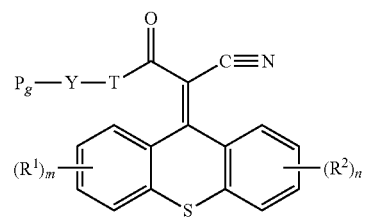

wherein:
m and n are independently 0, 1, 2, 3, or 4;
T is a bond, O, or NR;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$,
when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.
8. The method or use according to Clause 7, wherein m and n are each independently 0 or 1.
9. The method or use according to Clause 7, wherein Y at each occurrence is independently alkylene, cycloalkylene, heterocycloalkylene, arylene, heteroarylene, oxaalkylene, alkylene-amide-alkylene, alkylene-amine-alkylene, or combinations thereof.
10. The method or use according to Clause 7, wherein $P_g$ includes styryl, vinyl carbonate, vinyl ether, vinyl carbamate, N-vinyl lactam, N-vinylamide, (meth)acrylate, or (meth)acrylamide.
11. The method or use according to Clause 7, the contact lens further including a UV absorbing compound.
12. The method or use according to Clause 11, wherein the UV absorbing compound includes a compound of formula I, a benzophenone, a benzotriazole, a triazine, a substituted acrylonitrile, a salicyclic acid derivative, a benzoic acid derivative, a cinnamic acid derivative, a chalcone derivative, a dypnone derivative, a crotonic acid derivative, or mixtures thereof.

13. The method or use according to Clause 11, wherein the polymerizable compound suitable for making the contact lens includes a hydrophilic component, a silicone-containing component, or mixtures thereof.
14. The method or use according to any of Clauses 11 to 13, wherein the step of improving the vision attribute includes an improvement in the vision attribute as observed by a contact lens wearer when compared to a contact lens that transmits at least 90 percent of light across the wavelength range of 400 to 409 nm.
15. The method or use according to Clause 1, wherein the high energy visible light absorbing compound includes: 2-(2-cyano-2-(9H-thioxanthen-9-ylidene)acetamido) ethyl methacrylate; 2-(2-cyano-2-(9H-thioxanthen-9-ylidene)acetamido)ethyl acrylate; N-(2-(2-cyano-2-(9H-thioxanthen-9-ylidene)acetamido)ethyl) methacrylamide; N-(2-(2-cyano-2-(9H-thioxanthen-9-ylidene)acetamido)ethyl)acrylamide; 2-(2-cyano-N-methyl-2-(9H-thioxanthen-9-ylidene)acetamido)ethyl methacrylate; 2-cyano-2-(9H-thioxanthen-9-ylidene)-N-(2-(N-vinylacetamido)ethyl)acetamide; 2-(2-cyano-2-(9H-thioxanthen-9-ylidene)acetamido)-2-methylpropyl methacrylate; (E)-2-(2-cyano-2-(2,4-dichloro-9H-thioxanthen-9-ylidene)acetamido)ethyl methacrylate; (E)-2-(2-(2-chloro-9H-thioxanthen-9-ylidene)-2-cyanoacetamido)ethyl methacrylate; (E)-2-(2-cyano-2-(2-isopropyl-9H-thioxanthen-9-ylidene)acetamido)ethyl methacrylate; (E)-2-(2-cyano-2-(4-isopropyl-9H-thioxanthen-9-ylidene)acetamido)ethyl methacrylate; 2-(2-cyano-2-(9H-thioxanthen-9-ylidene)acetoxy)ethyl methacrylate; or mixtures thereof.
16. A method or use of a contact lens, including: applying, to at least one eye of a contact lens wearer, the contact lens that is a free radical reaction product of a reactive mixture including one or more polymerizable compounds suitable for making the contact lens and a high energy visible (HEV) light absorbing compound; and
improving, by the contact lens, overall preference of the contact lens while using computer screens and digital devices as observed by the contact lens wearer when compared to a Control lens that transmits at least 90 percent of light across the wavelength range of 400 to 409 nm.
17. The method or use according to Clause 16, the step of applying being further administered to a plurality of contact lens wearers, the method or use further including:
achieving, by the contact lens, approximately 77% improvement of preference, by the plurality of patients having a preference and worn both lenses after approximately 1-week of wear, computer screens and digital devices, as compared to the Control lens.
18. The method or use according to Clause 16, the step of applying being further administered to a plurality of contact lens wearers, the method or use further including:
achieving, by the contact lens, approximately 44% of overall preference, by the plurality of patients having a preference and worn both lenses after approximately 1-week of wear, computer screens and digital devices, as compared to the Control lens.
19. The method or use according to Clause 16, the step of applying being further administered to a plurality of contact lens wearers, the method or use further including:
achieving, by the contact lens, approximately 45% of overall preference, by the plurality of patients having a preference and worn both lenses after approximately 2-weeks of wear, computer screens and digital devices, as compared to the Control lens.
20. The method or use according to Clause 16, the step of applying being further administered to a plurality of contact lens wearers, the method or use further including:
achieving, by the contact lens, approximately 105% improvement of preference, by the plurality of patients having a preference and worn both lenses after approximately 2-weeks of wear, computer screens and digital devices, as compared to the Control lens.
21. A method or use of a contact lens, including:
applying, to at least one eye of a contact lens wearer, the contact lens that is a free radical reaction product of a reactive mixture including one or more polymerizable compounds suitable for making the contact lens and a high energy visible (HEV) light absorbing compound; and
improving, by the contact lens, comfort at the end of the day when compared to a Control lens that transmits at least 90 percent of light across the wavelength range of 400 to 409 nm.
22. The method or use according to Clause 21, the step of applying being further administered to a plurality of contact lens wearers, the method or use further including:
achieving, by the contact lens, approximately 22% improvement of preference, by the plurality of patients having a preference and worn both lenses after approximately 1-week of wear, comfort at the end of the day, as compared to the Control lens.
23. The method or use according to Clause 21, the step of applying being further administered to a plurality of contact lens wearers, the method or use further including:
achieving, by the plurality of patients having worn both lenses after approximately 2-weeks of wear, approximately 45% preference on comfort at the end of the day, by the contact lens as compared to the Control lens.
24. The method or use according to Clause 21, the step of applying being further administered to a plurality of contact lens wearers, the method or use further including:
achieving, by the contact lens, approximately 48% improvement of preference, by the plurality of patients having a preference and worn both lenses after approximately 2-weeks of wear, comfort at the end of the day, as compared to the Control lens.
25. The method or use according to Clause 21, the step of applying being further administered to a plurality of contact lens wearers, the method or use further comprising:
achieving, by the contact lens after approximately 2-weeks of wear, approximately 30% of subjects (95% CI: 23.0%, 38.6%) who strongly agreed (i.e., top 1 box proportion) that the contact lens was comfortable at the end of the day.
26. The method or use according to Clause 21, the step of applying being further administered to a plurality of contact lens wearers, the method or use further comprising:
achieving, after approximately 2-weeks of wear, approximately 30% of subjects (95% CI: 23.0%, 38.6%) who strongly agreed (i.e., top 1 box proportion) that the contact lens was comfortable at the end of the day, while approximately 20% of the subjects (95% CI: 14.3%, 27.4%) strongly agreed that the Control lens was comfortable at the end of the day.

27. The method or use according to Clause 21, the step of applying being further administered to a plurality of contact lens wearers, the method or use further comprising:
achieving, by the plurality of patients having worn both lenses after approximately 2-weeks of wear, approximately 75% of subjects (95% CI: 68.2%, 81.9%) who strongly agreed or agreed (i.e., top 2 box proportion) that the contact lens was comfortable at the end of the day.

28. The method or use according to Clause 21, the step of applying being further administered to a plurality of contact lens wearers, the method or use further comprising:
achieving, by the contact lens after approximately 2-weeks of wear, approximately 44% of subjects (95% CI: 35.6%, 53.1%) were very satisfied (i.e., top 1 box proportion) with the Test lens regarding comfort at the end of the day.

29. The method or use according to Clause 21, the step of applying being further administered to a plurality of contact lens wearers, the method or use further comprising:
achieving, by the plurality of patients having worn both lenses after approximately 1-week of wear, approximately 41% user preference on comfort at the end of the day, by the contact lens as compared to the Control lens.

30. The method or use according to Clause 21, the step of applying being further administered to a plurality of contact lens wearers, the method or use further comprising:
achieving, by the plurality of patients having worn both lenses after approximately 2-weeks of wear, approximately 45% user preference on comfort at the end of the day, by the contact lens as compared to the Control lens.

31. The method or use according to Clause 21, the step of applying being further administered to a plurality of contact lens wearers, the method or use further comprising:
achieving, by the contact lens, approximately 48% improvement of preference, by the plurality of patients having a preference and worn both lenses after approximately 2-weeks of wear, comfort at the end of the day, as compared to the Control lens.

32. A method or use of a contact lens, including:
applying, to at least one eye of a contact lens wearer, the contact lens that is a free radical reaction product of a reactive mixture including one or more polymerizable compounds suitable for making the contact lens and a high energy visible (HEV) light absorbing compound; and
achieving, by the contact lens after approximately 2-weeks of wear, approximately 30% of subjects (95% CI: 23.0%, 38.6%) strongly agreed on comfort at the end of the day.

33. The method or use according to Clause 32, wherein the top 1 box estimated proportion on comfort at the end of the day is compared to comfort at the end of the day of a Control lens that transmits at least 90 percent of light across the wavelength range of 400 to 409 nm.

34. A contact lens, including:
a free radical reaction product of a reactive mixture including one or more polymerizable compounds suitable for making the contact lens; and
a high energy visible (HEV) light absorbing compound, and
wherein, after approximately 2-weeks of wear, the contact lens is configured to achieve approximately 30.2% of subjects (95% CI: 23.0%, 38.6%) strongly agreed on comfort at the end of the day.

35. A contact lens, including:
a free radical reaction product of a reactive mixture including
one or more polymerizable compounds suitable for making the contact lens; and
a high energy visible (HEV) light absorbing compound, and
wherein, after approximately 2-weeks of wear, the contact lens is configured to achieve approximately 44% of subjects (95% CI: 35.6%, 53.1%) very satisfied with comfort at the end of the day.

36. A method or use of a contact lens, including:
applying to at least one eye of a contact lens wearer the contact lens that is a free radical reaction product of a reactive mixture including one or more polymerizable compounds suitable for making the contact lens and a high energy visible (HEV) light absorbing compound; and
improving, by the contact lens, CLUE Vision score when compared to a Control lens that transmits at least 90 percent of light across the wavelength range of 400 to 409 nm.

37. The method or use according to Clause 36, further including:
achieving, by the contact lens, a least square mean difference in CLUE Vision score of approximately 2.1 (95% CI: −0.5, 4.7) after approximately 1-week of wear.

38. The method or use according to Clause 36, further including:
achieving, by the contact lens, a least square mean difference in CLUE Vision score of approximately 3.3 (95% CI: 0.8, 5.7) after approximately 2-weeks of wear.

39. The method or use according to Clause 36, further including:
achieving, by the contact lens, a least square mean different in overall CLUE Vision score of approximately 2.7 (95% CI: 0.4, 4.9), the overall CLUE Vision score estimated across 1-week of wear and 2-weeks of wear.

40. A method or use of a contact lens, including:
applying to at least one eye of a contact lens wearer the contact lens that is a free radical reaction product of a reactive mixture including one or more polymerizable compounds suitable for making the contact lens and a high energy visible (HEV) light absorbing compound; and
improving, by the contact lens, an adjusted mean CLUE Comfort score when compared to a Control lens that transmits at least 90 percent of light across the wavelength range of 400 to 409 nm.

41. The method or use according to Clause 40, further including:
achieving, by the contact lens, a least square mean difference in CLUE Comfort score of approximately 4.6 (95% CI: 0.8, 8.4) after approximately 1-week of wear.

42. The method or use according to Clause 40, further including:
achieving, by the contact lens, a least square mean difference in CLUE Comfort score of approximately 3.9 (95% CI: 0.1, 7.7) after approximately 2-week of wear.

43. The method or use according to Clause 40, further including:
achieving, by the contact lens, a least square mean difference in overall CLUE Comfort score of approximately 4.3 (95% CI: 0.9, 7.6), the overall CLUE Comfort score estimated across 1-week of wear and 2-weeks of wear.

44. A method or use of a contact lens, including:
applying to at least one eye of a contact lens wearer the contact lens that is a free radical reaction product of a reactive mixture including one or more polymerizable compounds suitable for making the contact lens and a high energy visible (HEV) light absorbing compound; and
achieving, by the contact lens after approximately 2-weeks of wear, approximately 46% of subjects (95% CI: 36.6%, 56.1%) strongly agreed on clarity of vision while driving at night.

45. The method or use according to Clause 44, wherein the top 1 box estimated proportion on comfort at the end of the day is compared to comfort at the end of the day of a Control lens that transmits at least 90 percent of light across the wavelength range of 400 to 409 nm.

46. A contact lens, including:
a free radical reaction product of a reactive mixture including:
one or more polymerizable compounds suitable for making the contact lens; and
a high energy visible (HEV) light absorbing compound, and
wherein, after approximately 2-weeks of wear, the contact lens is configured to achieve approximately 46% of subjects (95% CI: 36.6%, 56.1%) strongly agreed on clarity of vision while driving at night.

47. A method or use of a contact lens, including:
applying to at least one eye of a contact lens wearer the contact lens that is a free radical reaction product of a reactive mixture including one or more polymerizable compounds suitable for making the contact lens and a high energy visible (HEV) light absorbing compound; and
achieving, by the contact lens after approximately 2-weeks of wear, approximately 43% of subjects (95% CI: 34.9%, 52.1%) strongly agreed on confidence to drive at night.

48. The method or use according to Clause 47, wherein the top 1 box estimated proportion on comfort at the end of the day is compared to comfort at the end of the day of a Control lens that transmits at least 90 percent of light across the wavelength range of 400 to 409 nm.

49. A contact lens, including:
a free radical reaction product of a reactive mixture including:
one or more polymerizable compounds suitable for making the contact lens; and a high energy visible (HEV) light absorbing compound,
and
wherein, after approximately 2-weeks of wear, the contact lens is configured to achieve approximately 43% of subjects (95% CI: 34.9%, 52.1%) strongly agreed on confidence to drive at night.

50. A method or use of a contact lens, including:
applying to at least one eye of a contact lens wearer the contact lens that is a free radical reaction product of a reactive mixture including:
one or more polymerizable compounds suitable for making the contact lens; and
a high energy visible (HEV) light absorbing compound, and
achieving, by the contact lens after approximately 2-weeks of wear, approximately 57% of subjects (95% CI: 47.2%, 65.7%) who rated the lens as excellent (i.e., top 1 box estimated proportion) with regard to the ability to see comfortably while driving at night.

51. The method or use according to Clause 50, wherein the top 1 box estimated proportion of subjects who rated the lens as excellent with regard to the ability to see comfortably while driving at night is compared to a Control lens that transmits at least 90 percent of light across the wavelength range of 400 to 409 nm.

52. A contact lens, including:
a free radical reaction product of a reactive mixture including:
one or more polymerizable compounds suitable for making the contact lens; and
a high energy visible (HEV) light absorbing compound, and
wherein, after approximately 2-weeks of wear, the contact lens is configured to achieve approximately 57% (95% CI: 47.2%, 65.7%) top 1 box estimated proportion on ability to see comfortably while driving at night.

53. A contact lens, including:
a free radical reaction product of a reactive mixture including:
one or more polymerizable compounds suitable for making the contact lens; and
a high energy visible (HEV) light absorbing compound, and
wherein the contact lens configured to achieve any of the herein described benefits, including but not limited to overall opinion, overall comfort, overall vision, overall preference of the contact lens while using computer screens and digital devices as observed by the contact lens wearer, comfort at the end of the day, CLUE Comfort score, CLUE Vision score.

What is claimed is:
1. A method of use of a first contact lens, comprising:
applying to at least one eye of a subject, the first contact lens that is a free radical reaction product of a reactive mixture comprising one or more polymerizable compounds suitable for making the contact lens and a high energy visible (HEV) light absorbing compound; and
improving, by the first contact lens, comfort at the end of the day when compared to a control lens that transmits at least 90 percent of light across the wavelength range of 400 to 409 nm, wherein the high energy visible light absorbing compound comprises a compound of formula I:

Formula I

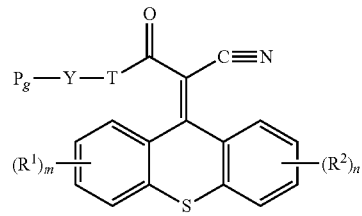

wherein:
m and n are independently 0, 1, 2, 3, or 4;
T is a bond, O, or NR;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.

2. The method according to claim 1, the step of applying being further administered to a plurality of subjects, the method further comprising:
achieving, by the first contact lens after approximately 2-weeks of wear of the first contact lens by the subjects, approximately 30% of the subjects (95% CI: 23.0%, 38.6%) strongly agree on comfort at the end of the day.

3. The method according to claim 2, wherein, after approximately 2-weeks of wear of the first contact lens and the control lens by the subjects, approximately 20% of subjects (95% CI: 14.3%, 27.4%) strongly agree on comfort at the end of the day of the control lens such that the subjects are 1.73 times (95% CI for odds ratio: 1.11, 2.68) more likely to strongly agree with comfort at the end of the day of the first contact lens compared to the control lens after approximately 2-weeks of wear.

4. The method according to claim 1, the step of applying being further administered to a plurality of subjects, the method further comprising:
achieving, by the first contact lens, a least square mean difference in overall contact lens user experience ("CLUE") comfort score of approximately 4.3 (95% CI: 0.9, 7.6) estimated across 1-week and 2-weeks of wear of the first contact lens and the control lens by the subjects.

5. The method according to claim 1, the step of applying being further administered to a plurality of contact lens wearers, the method further comprising: achieving, by the first contact lens after approximately 2-weeks of wear of the first contact lens by the subjects, approximately 44% of subjects (95% CI: 35.6%, 53.1%) very satisfied with comfort at the end of the day.

6. The method according to claim 5, wherein, after approximately 2-weeks of wear of the first contact lens and the control lens approximately 32% of subjects (95% CI: 24.8%, 41.1) very satisfied with comfort at the end of the day of the control lens such that the subjects are 1.65 times (95% CI for odds ratio: 1.09, 2.49) more likely to be very satisfied with comfort at the end of the day of the first lens compared to the control lens after approximately 2-weeks of wear.

7. The method according to claim 1, the step of applying being further administered to a plurality of subjects, the method further comprising:
achieving, by the first contact lens, approximately 48% improvement by preference in comfort at the end of the day for the first lens compared to the control lens, by the plurality of subjects having a preference and worn both the first lens and the control lens after approximately 2-weeks of wear.

8. The method according to claim 1, the step of applying being further administered to a plurality of contact lens wearers, the method further comprising:
achieving, by the first contact lens, approximately 22% improvement of preference in comfort at the end of the day for the first lens compared to the control lens, by the plurality of subjects having a preference.

9. A method of use of a first contact lens, comprising:
applying to at least one eye of a subject the first contact lens that is a free radical reaction product of a reactive mixture comprising one or more polymerizable compounds suitable for making the contact lens and a high energy visible (HEV) light absorbing compound; and
improving, by the contact lens, clarity of vision while driving at night when compared to a control lens that transmits at least 90 percent of light across the wavelength range of 400 to 409 nm, wherein the high energy visible light absorbing compound comprises a compound of formula I:

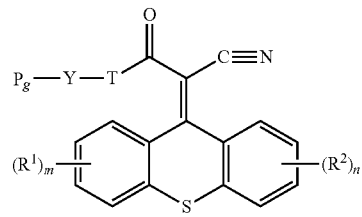

Formula I wherein:
m and n are independently 0, 1, 2, 3, or 4:
T is a bond, O, or NR;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.

10. The method according to claim 9, the step of applying being further administered to a plurality of subjects, the method further comprising:
achieving, by the first contact lens after approximately 2-weeks of wear of the first contact lens, approximately 46% of subjects (95% CI: 36.6%, 56.1%) strongly agreed (i.e., top 1 box) that their vision was clear enough to allow them to drive at night.

11. The method according to claim 10, wherein after approximately 2-weeks of wear of the first contact lens and the control lens, approximately 34% of subjects (95% CI: 25.4%, 43.4%) strongly agreed that while wearing the control lens their vision was clear enough to allow them to drive at night such that the subjects are 1.68 times (95% CI for odds ratio: 1.24, 2.28) more likely to strongly agreed with vision being clear enough to allow driving at night compared to the control lens after approximately 2-weeks of wear.

12. A method of use of a first contact lens, comprising:
applying to at least one eye of a subject the first contact lens that is a free radical reaction product of a reactive mixture comprising one or more polymerizable compounds suitable for making the contact lens and a high energy visible (HEV) light absorbing compound; and
improving, by the first contact lens, overall preference of the first contact lens while using computer screens and digital devices as observed by the contact lens wearer when compared to a control lens that transmits at least 90 percent of light across the wavelength range of 400 to 409 nm, wherein the high energy visible light absorbing compound comprises a compound of formula I:

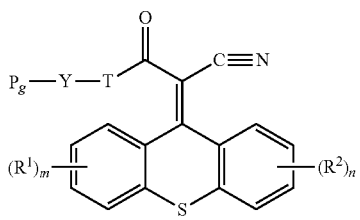

Formula I wherein:
m and n are independently 0, 1, 2, 3, or 4;
T is a bond, O, or NR;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.

13. The method according to claim 12, the step of applying being further administered to a plurality of subjects, the method further comprising:
achieving, by the first contact lens, approximately 77% improvement of preference for the first contact lens compared to the control lens when viewing computer screens and digital devices, by the plurality of subjects having a preference and worn both the first contact lens and the control lens after approximately 1-week of wear.

14. The method according to claim 12, the step of applying being further administered to a plurality of subjects, the method further comprising:
achieving, by the first contact lens, approximately 105% improvement of preference for the first contact lens compared to the control lens when viewing computers screens and digital devices, by the plurality of subjects having a preference and worn both the first contact lens and the control lens after approximately 2-weeks of wear.

15. The method according to claim 12, the step of applying being further B administered to a plurality of subjects, the method further comprising:
achieving, by the first contact lens, approximately 44% of overall preference for the first contact lens compared to the control lens when viewing computer screens and digital devices, by the plurality of subjects having a preference and worn both the first contact lens and the control lens after approximately 1-week of wear.

16. The method according to claim 12, the step of applying being further B administered to a plurality of subjects, the method further comprising:
achieving, by the first contact lens, approximately 45% of overall preference for the first contact lens compared to the control lens when viewing computer screens and digital devices, by the plurality of subjects having a preference and worn both the first contact lens and the control lens after approximately 2-weeks of wear.

17. A method of improving comfort at the end of the day by using a first contact lens applied to at least one eye of a subject, the method comprising:
applying the first contact lens to at least one eye of the subject, wherein the first contact is a free radical reaction product of a reactive mixture comprising one or more polymerizable compounds suitable for making the contact lens and a high energy visible (HEV) light absorbing compound; and
achieving, by the first contact lens, a least square means difference in contact lens user experience ("CLUE") Comfort scale of approximately 3.9, the difference indicative of an improved comfort at the end of the day as measured by a contact lens user experience ("CLUE") scale estimated across 1-week and 2-weeks of wear of the first contact lens and a control lens that transmits at least 90 percent of light across the wavelength range of 400 to 409 nm by the subject, wherein the high energy visible light absorbing compound comprises a compound of formula I:

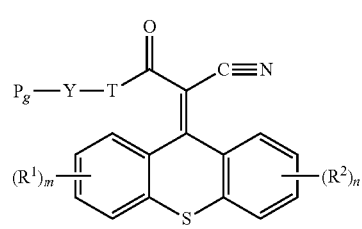

Formula I wherein:
m and n are independently 0, 1, 2, 3, or 4;
T is a bond, O, or NR;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.

18. A method of use of a first contact lens, comprising:
applying to at least one eye of a subject, the first contact lens that is a free radical reaction product of a reactive mixture comprising one or more polymerizable compounds suitable for making the contact lens and a high energy visible (HEV) light absorbing compound; and
improving by at least 48.2%, by the first contact lens, comfort at the end of the day when compared to a control lens that transmits at least 90 percent of light across the wavelength range of 400 to 409 nm, wherein the high energy visible light absorbing compound comprises a compound of formula I:

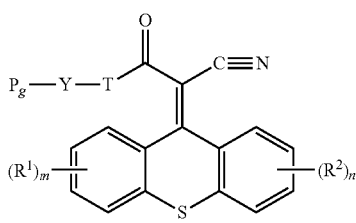

Formula I wherein:
m and n are independently 0, 1, 2, 3, or 4;
T is a bond, O, or NR;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.

19. The method according to claim 18, the step of applying being further administered to a plurality of subjects, the method further comprising:
achieving, by the first contact lens after approximately 2-weeks of wear of the first contact lens by the subjects, approximately 30% of the subjects (95% CI: 23.0%, 38.6%) strongly agree on comfort at the end of the day.

20. The method according to claim 19, wherein, after approximately 2-weeks of wear of the first contact lens and the control lens by the subjects, approximately 20% of subjects (95% CI: 14.3%, 27.4%) strongly agree on comfort at the end of the day of the control lens such that the subjects are 1.73 times (95% CI for odds ratio: 1.11, 2.68) more likely to strongly agree with comfort at the end of the day of the first contact lens compared to the control lens after approximately 2-weeks of wear.

21. The method according to claim 18, the step of applying being further administered to a plurality of subjects, the method further comprising:
achieving, by the first contact lens, a least square mean difference in overall CLUE comfort score of approximately 4.3 (95% CI: 0.9, 7.6) estimated across 1-week and 2-weeks of wear of the first contact lens and the control lens by the subjects.

22. The method according to claim 20, the step of applying being further B administered to a plurality of contact lens wearers, the method further comprising: achieving, by the first contact lens after approximately 2-weeks of wear of the first contact lens by the subjects, approximately 44% of subjects (95% CI: 35.6%, 53.1%) very satisfied with comfort at the end of the day.

23. The method according to claim 22, wherein, after approximately 2-weeks of wear of the first contact lens and the control lens approximately 32% of subjects (95% CI: 24.8%, 41.1) very satisfied with comfort at the end of the day of the control lens such that the subjects are 1.65 times (95% CI for odds ratio: 1.09, 2.49) more likely to be very satisfied with comfort at the end of the day of the first lens compared to the control lens after approximately 2-weeks of wear.

24. The method according to claim 18, the step of applying being further administered to a plurality of subjects, the method further comprising:
achieving, by the first contact lens, approximately 48% improvement by preference in comfort at the end of the day for the first lens compared to the control lens, by the plurality of subjects having a preference and worn both the first lens and the control lens after approximately 2-weeks of wear.

25. The method according to claim 18, the step of applying being further administered to a plurality of contact lens wearers, the method further comprising:
achieving, by the first contact lens, approximately 22% improvement of preference in comfort at the end of the day for the first lens compared to the control lens, by the plurality of subjects having a preference.

26. A method of use of a first contact lens, comprising:
applying to at least one eye of a subject the first contact lens that is a free radical reaction product of a reactive mixture comprising one or more polymerizable compounds suitable for making the contact lens and a high energy visible (HEV) light absorbing compound; and
improving by approximately 1.68 times, by the contact lens, clarity of vision while driving at night when compared to a control lens that transmits at least 90 percent of light across the wavelength range of 400 to 409 nm, wherein the high energy visible light absorbing compound comprises a compound of formula I:

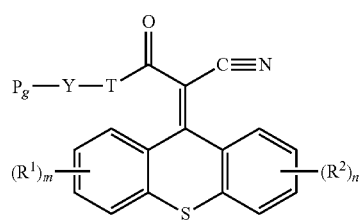

Formula I wherein:
m and n are independently 0, 1, 2, 3, or 4;
T is a bond, O, or NR;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.

27. The method according to claim 26, the step of applying being further B administered to a plurality of subjects, the method further comprising:
achieving, by the first contact lens after approximately 2-weeks of wear of the first contact lens, approximately 46% of subjects (95% CI: 36.6%, 56.1%) strongly agreed (i.e., top 1 box) that their vision was clear enough to allow them to drive at night.

28. The method according to claim 27, wherein after approximately 2-weeks of wear of the first contact lens and the control lens, approximately 34% of subjects (95% CI: 25.4%, 43.4%) strongly agreed that while wearing the control lens their vision was clear enough to allow them to drive at night such that the subjects are 1.68 times (95% CI for odds ratio: 1.24, 2.28) more likely to strongly agreed with vision being clear enough to allow driving at night compared to the control lens after approximately 2-weeks of wear.

29. A method of use of a first contact lens, comprising:
applying to at least one eye of a subject the first contact lens that is a free radical reaction product of a reactive mixture comprising one or more polymerizable compounds suitable for making the contact lens and a high energy visible (HEV) light absorbing compound; and
improving by at least 105%, by the first contact lens, overall preference of the first contact lens while using computer screens and digital devices as observed by the contact lens wearer when compared to a control lens that transmits at least 90 percent of light across the wavelength range of 400 to 409 nm, wherein the high energy visible light absorbing compound comprises a compound of formula I:

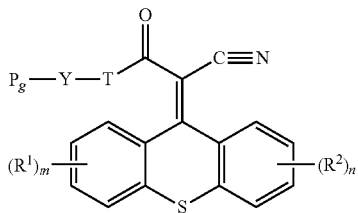

Formula I wherein:
m and n are independently 0, 1, 2, 3, or 4;
T is a bond, O, or NR;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$, thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.

30. The method according to claim 29, the step of applying being further administered to a plurality of subjects, the method further comprising:
achieving, by the first contact lens, approximately 77% improvement of preference for the first contact lens compared to the control lens when viewing computer screens and digital devices, by the plurality of subjects having a preference and worn both the first contact lens and the control lens after approximately 1-week of wear.

31. The method according to claim 29, the step of applying being further administered to a plurality of subjects, the method further comprising:
achieving, by the first contact lens, approximately 105% improvement of preference for the first contact lens compared to the control lens when viewing computers screens and digital devices, by the plurality of subjects having a preference and worn both the first contact lens and the control lens after approximately 2-weeks of wear.

32. The method according to claim 29, the step of applying being further administered to a plurality of subjects, the method further comprising:
achieving, by the first contact lens, approximately 44% of overall preference for the first contact lens compared to the control lens when viewing computer screens and digital devices, by the plurality of subjects having a preference and worn both the first contact lens and the control lens after approximately 1-week of wear.

33. The method according to claim 29, the step of applying being further administered to a plurality of subjects, the method further comprising:
achieving, by the first contact lens, approximately 45% of overall preference for the first contact lens compared to the control lens when viewing computer screens and digital devices, by the plurality of subjects having a preference and worn both the first contact lens and the control lens after approximately 2-weeks of wear.

* * * * *